United States Patent

Stanley et al.

(10) Patent No.: US 11,371,619 B2
(45) Date of Patent: Jun. 28, 2022

(54) MEMBRANELESS FLUID-CONTROLLED VALVE

(71) Applicant: Facebook Technologies, LLC, Menlo Park, CA (US)

(72) Inventors: Andrew Arthur Stanley, Seattle, WA (US); Erik Samuel Roby, Redmond, WA (US); Casey Glick, Kirkland, WA (US); Serol Turkyilmaz, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 39 days.

(21) Appl. No.: 16/516,640

(22) Filed: Jul. 19, 2019

(65) Prior Publication Data

US 2021/0018102 A1 Jan. 21, 2021

(51) Int. Cl.
*F16K 3/02* (2006.01)
*F16K 99/00* (2006.01)

(52) U.S. Cl.
CPC .......... *F16K 3/0254* (2013.01); *F16K 3/0263* (2013.01); *F16K 99/0011* (2013.01); *F16K 99/0055* (2013.01); *F16K 2099/0074* (2013.01)

(58) Field of Classification Search
None
See application file for complete search history.

(56) References Cited

U.S. PATENT DOCUMENTS

| | | | | |
|---|---|---|---|---|
| 1,849,702 A | * | 3/1932 | Bard | G05D 16/10 137/113 |
| 3,057,551 A | * | 10/1962 | Etter | F15C 3/02 235/201 ME |
| 4,262,062 A | * | 4/1981 | Zatsky | H01M 50/216 429/407 |
| 4,396,345 A | * | 8/1983 | Hutchinson | F04B 49/225 415/28 |
| 4,848,722 A | | 7/1989 | Webster | |
| 5,131,729 A | * | 7/1992 | Wetzel | B60T 8/17616 303/113.5 |

(Continued)

FOREIGN PATENT DOCUMENTS

WO 2021/015953 A1 1/2021

OTHER PUBLICATIONS

International Search Report and Written Opinion received for PCT Application Serial No. PCT/US2020/041295 dated Oct. 1, 2020, 11 pages.

(Continued)

*Primary Examiner* — Daphne M Barry
(74) *Attorney, Agent, or Firm* — FisherBroyles, LLP

(57) ABSTRACT

Example devices include a fluidic device, such as a fluidic valve, including a body formed from a rigid body material including a fluidic source, a fluidic drain, and a fluidic gate, each of which may have a fluid connection with a chamber, or a portion thereof. The device may further include a gate transmission element, located within the chamber, that is controllable between at least a first position and a second position using a gate pressure received through the fluidic drain. Adjustment of the position of the gate transmission element may allow control of fluid flow through the device. Other devices, methods, systems, and computer-readable media are also disclosed.

19 Claims, 21 Drawing Sheets

(56) References Cited

U.S. PATENT DOCUMENTS

| | | | |
|---|---|---|---|
| 6,006,776 A * | 12/1999 | Dill | F16K 11/07 137/109 |
| 6,406,605 B1 | 6/2002 | Moles | |
| 6,461,335 B1 | 10/2002 | Noecker | |
| 6,474,623 B1 | 11/2002 | Davies | |
| 6,782,746 B1 * | 8/2004 | Hasselbrink, Jr. | F15C 5/00 73/253 |
| 6,823,895 B2 | 11/2004 | Hitchcock et al. | |
| 6,949,176 B2 | 9/2005 | Vacca et al. | |
| 7,138,976 B1 | 11/2006 | Bouzit et al. | |
| 7,156,365 B2 * | 1/2007 | Fuller | H02M 3/156 251/129.04 |
| 7,296,592 B2 * | 11/2007 | Rehm | B01L 3/502738 137/528 |
| 8,844,570 B2 | 9/2014 | Glick | |
| 8,922,355 B2 | 12/2014 | Kusuura | |
| 9,132,425 B2 | 9/2015 | Wen et al. | |
| 9,371,965 B2 | 6/2016 | Devaraju et al. | |
| 9,964,224 B2 * | 5/2018 | Germiquet | G04B 47/066 |
| 10,352,960 B1 * | 7/2019 | Shcheglov | B81B 3/0072 |
| 10,831,299 B1 * | 11/2020 | Lukens | G06F 3/0412 |
| 2002/0014607 A1 | 2/2002 | Abromaitis | |
| 2002/0158217 A1 | 10/2002 | Inoue et al. | |
| 2003/0010946 A1 | 1/2003 | Furukawa et al. | |
| 2003/0141470 A1 | 7/2003 | Igarashi | |
| 2003/0196695 A1 | 10/2003 | O'Connor et al. | |
| 2004/0033108 A1 | 2/2004 | Raftis et al. | |
| 2004/0056220 A1 | 3/2004 | Raftis | |
| 2004/0079424 A1 * | 4/2004 | Takeda | F16K 99/0048 137/624.13 |
| 2004/0118646 A1 | 6/2004 | Lun | |
| 2005/0049546 A1 | 3/2005 | Messerly et al. | |
| 2005/0121090 A1 * | 6/2005 | Hunnicutt | B60T 8/366 137/625.65 |
| 2006/0058740 A1 | 3/2006 | Cise et al. | |
| 2006/0163506 A1 | 7/2006 | Cook et al. | |
| 2006/0243934 A1 | 11/2006 | Chung et al. | |
| 2007/0170382 A1 * | 7/2007 | Li | F16K 31/122 251/5 |
| 2007/0181835 A1 | 8/2007 | Hanada | |
| 2008/0087853 A1 | 4/2008 | Kees | |
| 2008/0105307 A1 * | 5/2008 | Andoh | F16K 11/07 137/495 |
| 2008/0148884 A1 * | 6/2008 | Knipe | F16H 21/16 74/25 |
| 2008/0264863 A1 | 10/2008 | Quake et al. | |
| 2009/0007969 A1 | 1/2009 | Gundel | |
| 2009/0121166 A1 | 5/2009 | Gabelgaard | |
| 2009/0145502 A1 | 6/2009 | Dirac et al. | |
| 2009/0302244 A1 | 12/2009 | Wedel | |
| 2010/0093559 A1 | 4/2010 | Fan et al. | |
| 2010/0170572 A1 | 7/2010 | Sahoo et al. | |
| 2010/0180970 A1 | 7/2010 | Welle | |
| 2010/0228222 A1 | 9/2010 | Williams et al. | |
| 2010/0260617 A1 | 10/2010 | Haertl | |
| 2010/0261137 A1 | 10/2010 | Boyd et al. | |
| 2011/0045599 A1 | 2/2011 | Erickson et al. | |
| 2011/0254672 A1 | 10/2011 | Ciesla et al. | |
| 2012/0039770 A1 | 2/2012 | Namkoong et al. | |
| 2012/0182135 A1 | 7/2012 | Kusuura | |
| 2012/0275929 A1 | 11/2012 | Salsman | |
| 2013/0156615 A1 | 6/2013 | Puleo et al. | |
| 2013/0234054 A1 | 9/2013 | Eijkelenberg et al. | |
| 2014/0062954 A1 | 3/2014 | Ciesla et al. | |
| 2014/0130920 A1 | 5/2014 | Fernandes et al. | |
| 2014/0134001 A1 | 5/2014 | Uchida et al. | |
| 2016/0228889 A1 | 8/2016 | Maruyama et al. | |
| 2016/0238040 A1 | 8/2016 | Gallo et al. | |
| 2016/0258543 A1 | 9/2016 | Van Den Bijgaart et al. | |
| 2016/0363997 A1 | 12/2016 | Black et al. | |
| 2017/0086321 A1 * | 3/2017 | de Jong | H05K 5/0213 |
| 2017/0203028 A1 | 7/2017 | Carr et al. | |
| 2017/0300115 A1 | 10/2017 | Kerr et al. | |
| 2018/0018858 A1 | 1/2018 | Provancher et al. | |
| 2018/0038513 A1 | 2/2018 | Baldea et al. | |
| 2018/0209562 A1 | 7/2018 | Keller et al. | |
| 2019/0063619 A1 * | 2/2019 | Keller | F16K 31/02 |
| 2019/0212824 A1 | 7/2019 | Keller et al. | |

OTHER PUBLICATIONS

Pacchierotti et al., "Wearable Haptic Systems for the Fingertip and the Hand: Taxonomy, Review, and Perspectives", IEEE Transactions on Haptics, vol. 10, No. 4, May 9, 2017, pp. 580-600.

Sochol et al., "3D printed microfluidic circuitry via multijet-based additive manufacturing", Lab on a Chip, vol. 16, Jan. 4, 2016, pp. 668-678.

Gottmann et al., "Digital photonic production of micro structures in glass by in-volume selective laser-induced etching using a high speed micro scanner", ScienceDirect, Physics Procedia, vol. 39, Nov. 10, 2012, pp. 534-541.

Gottmann et al., "Selective Laser-Induced Etching of 3D Precision Quartz Glass Components for Microfluidic Applications—Up-Scaling of Complexity and Speed", MDPI, Micromachines, vol. 8, No. 4, Article 110, Apr. 1, 2017, pp. 1-10.

Hermans et al., "Selective, Laser-Induced Etching of Fused Silica at High Scan-Speeds Using KOH", JLMN—Journal of Laser Micro/Nanoengineering, vol. 9, No. 2, Jan. 6, 2014, pp. 126-131.

Frank et al., "Integrated Microfluidic Membrane Transistor Utilizing Chemical Information for On-Chip Flow Control", PLoS One, vol. 11, No. 8, Aug. 29, 2016, pp. 1-17.

Eddington et al., "Flow control with hydrogels", ScienceDirect, Advanced Drug Delivery Reviews, vol. 56, No. 2, Feb. 10, 2004, pp. 199-210.

Grayson et al., "A BioMEMS Review: MEMS Technology for Physiologically Integrated Devices", Proceedings of the IEEE, vol. 92, No. 1, Nov. 8, 2004, pp. 6-21.

Mohan et al., "Design considerations for elastomeric normally closed microfluidic valves", ScienceDirect, Sensors and Actuators B: Chemical, vol. 160, No. 1, Dec. 15, 2011, pp. 1216-1223.

Perdigones et al., "Correspondence Between Electronics and Fluids in MEMS: Designing Microfluidic Systems Using Electronics", IEEE Industrial Electronics Magazine, vol. 8, No. 4, Dec. 12, 2014, 12 pages.

Zhang et al., "Microfluidic Passive Flow Regulatory Device with an Integrated Check Valve for Enhanced Flow Control", MDPI, Micromachines, vol. 10, No. 10, Article 653, Sep. 27, 2019, pp. 1-12.

Thorsen et al., "Microfluidic Large-Scale Integration", Science, vol. 298, Issue 5593, Oct. 18, 2002, pp. 580-584.

Rinderknecht et al., "Combined Tendon Vibration and Virtual Reality for Post-Stroke Hand Rehabilitation", IEEE World Haptics Conference (IEEE WHC), Apr. 14, 2013, 6 pages.

Provancher et al., "Tactile Perception of Rotational Sliding", Second Joint EuroHaptics Conference and Symposium on Haptic Interfaces for Virtual Environment and Teleoperator Systems (WHC'07), Mar. 22, 2007, 6 pages.

International Preliminary Report on Patentability for International Application No. PCT/US2020/041295, dated Feb. 3, 2022, 9 pages.

* cited by examiner

MEMBRANELESS FLUID-CONTROLLED VALVE

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
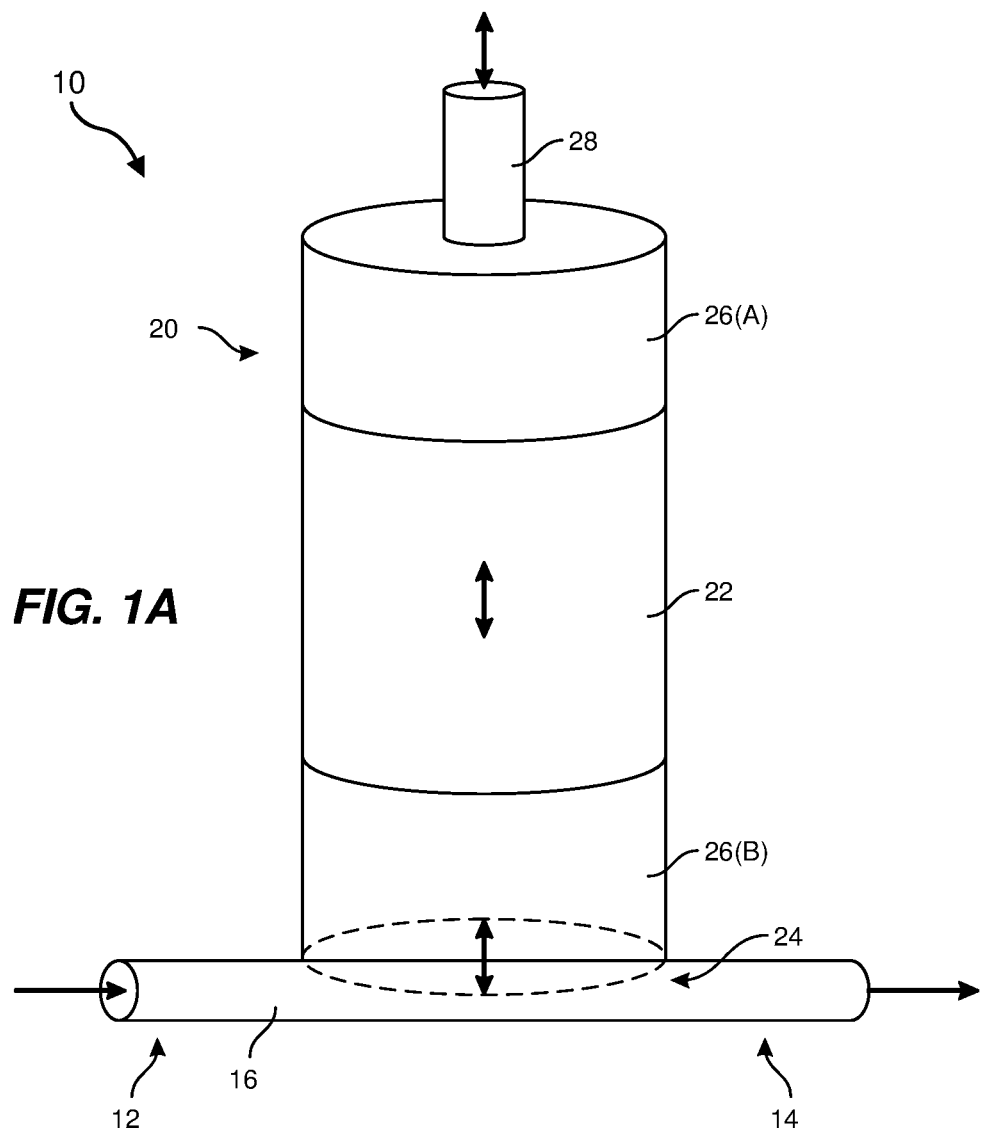
FIG. 1A depicts an example fluidic valve in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to, for example, fluidic devices, such as fluidic valves (which may also be referred to as fluidistors), and other devices and systems including one or more fluidic valves. Other aspects include methods relating to fluidic devices, such as device operation and device fabrication.

As will be described in greater detail below, embodiments of the instant disclosure describe fluidic devices, systems, and methods. In some examples, a fluidic device provides a fluidic output (which may include an output pressure and/or an output flow rate) that may depend on a fluidic input (such as an input pressure and/or input flow rate), or other input.

Conventional fluidic valves include one or more resilient and/or compliant components, such as a membrane, washer, or similar element, to achieve an acceptable seal. However, in some examples described herein, an excellent seal may be formed between two complementary and conforming rigid surfaces, for example, between two planar surfaces. In such examples, no appreciably resilient, compliant, or flexible component is required. In this context, the terms resilient, compliant, or flexible may refer to component behavior under normal operating pressures and forces. In some examples, fluidic valves may include a rigid housing and a rigid gate transmission element, that may show no appreciable (e.g., to the unassisted eye) deformation under normal operating conditions. Fluid flow may be restricted or prevented by a contact between rigid surfaces. Fluidic valves may be constructed without a membrane, O-ring, gasket, or other non-rigid components. There may be several advantages to fabricating a fluidic valve without a resilient, compliant, and/or flexible component. For example, the viscoelastic properties of a resilient or compliant component (or other non-rigid component, such as a flexible membrane) may change over time, for example, as a material ages. Also, the resilient or other elastic properties of a material may decrease or otherwise change over time, and may be lost entirely in aged materials, leading to device failure. A membraneless device may not require the use of any elastic or otherwise non-rigid materials, increasing device stability. A membraneless device may not require bonding of elastic materials, facilitating fabrication. In some examples, fluidic devices, including fluidic valve analogs to pFET, nFET, and cFET devices, may be fabricated from generally rigid materials. An pFET device may be a normally open device, an nFET device may be a normally closed device, and a cFET device may combine the functionality of a pFET device and an nFET device into a single device package. Example membraneless devices may not require the use of non-rigid materials (such as resilient, compliant, flexible, or elastic materials). This may improve the stability, reliability, and/or lifetime of the membraneless devices, while possibly also simplifying fabrication.

In some examples, devices include fluidic valves in which a fluid seal is provided by urging a rigid surface of a gate transmission element against a rigid interior surface of a chamber formed in a body, for example, using a fluid pressure received from a gate. In some examples, a fluidic valve may include one or more components including a compliant material, such as an O-ring, gasket, compliant film, membrane, or other component. One or more components including a compliant material may be used to enhance the quality of the seal. A device may include one or more compliant components, such as a component which may be associated with the gate transmission element, for example, a component located at or near an end portion and/or peripheral portion of a gate transmission element. In some examples, a component, which may include a compliant material, may provide a mechanical restoring force on an element (such as a gate transmission element) to help restore a position of the element to a desired position, such as an equilibrium position. A device may include one or more components, such as a spring, membrane, partial membrane, and the like. In some examples, at least one of the gate transmission element or the body may include a compliant material. In some examples, a membraneless fluidic device may be fabricated as a single piece (e.g., having a monolithic body) using a printable silicone, in which examples the contact surfaces are not rigid. Approaches may be used that in some cases increase fabrication difficulty, but improve the device seal. In some examples, a seal or film may not fully separate the regions of the fluidistor unless the fluidistor is in a particular state (e.g., with the gate transmission element in a first or second position, which may correspond to an open or closed device state, or similar). For example, when the gate transmission element is in a first or second position, a sealing mechanism may prevent gate fluid from moving into, for example, an interstitial or channel region. However, when the gate transmission element is in an intermediate position (e.g., in transition between the first and second position), the seal may be broken so that the regions are no longer completely separated.

Figure 1B:
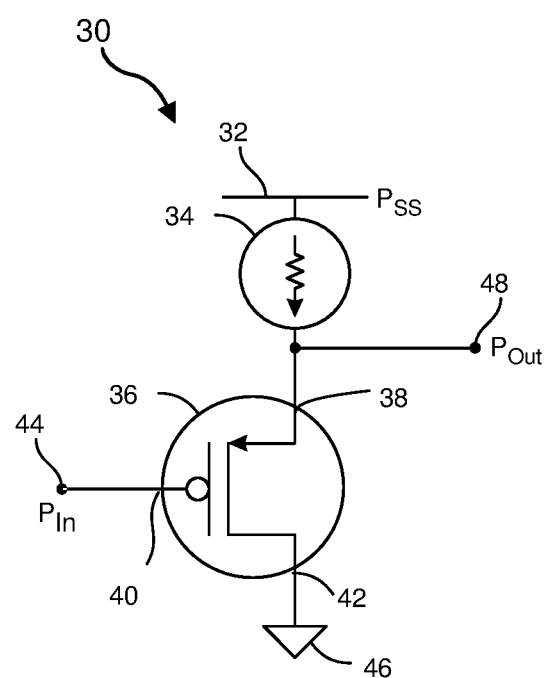
FIG. 1B depicts a fluidic schematic drawing showing a fluidic circuit including an example fluidic valve, in accordance with some embodiments.
Figure 2A:
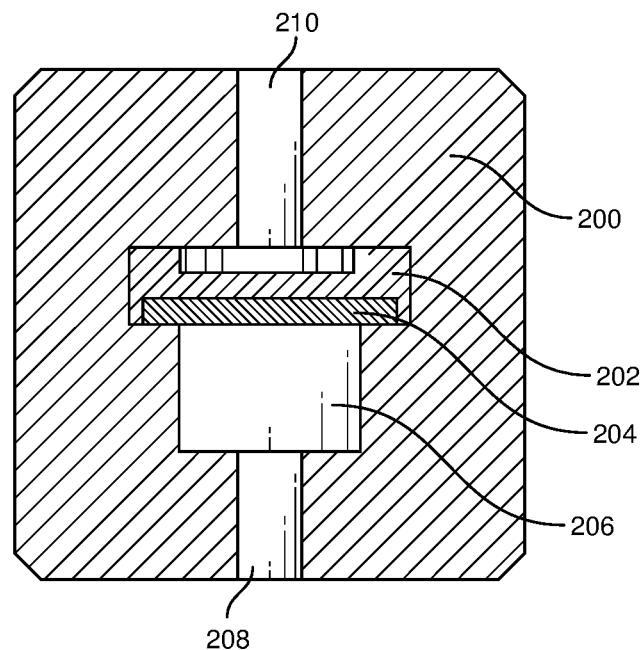
FIGS. 2A and 2B depict a flow diode, configured to allow flow in only one direction, in accordance with some embodiments.
Figure 2B:
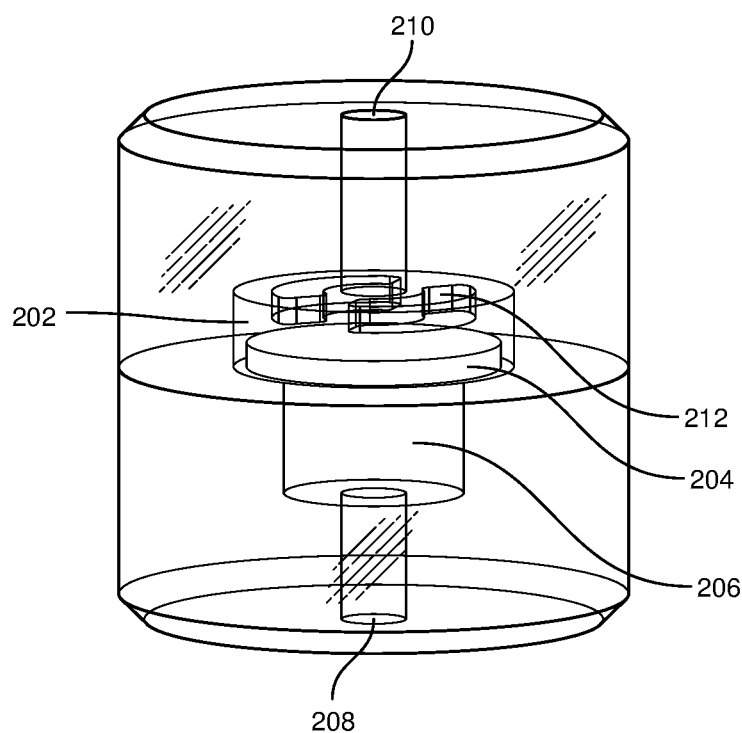
Figure 10:
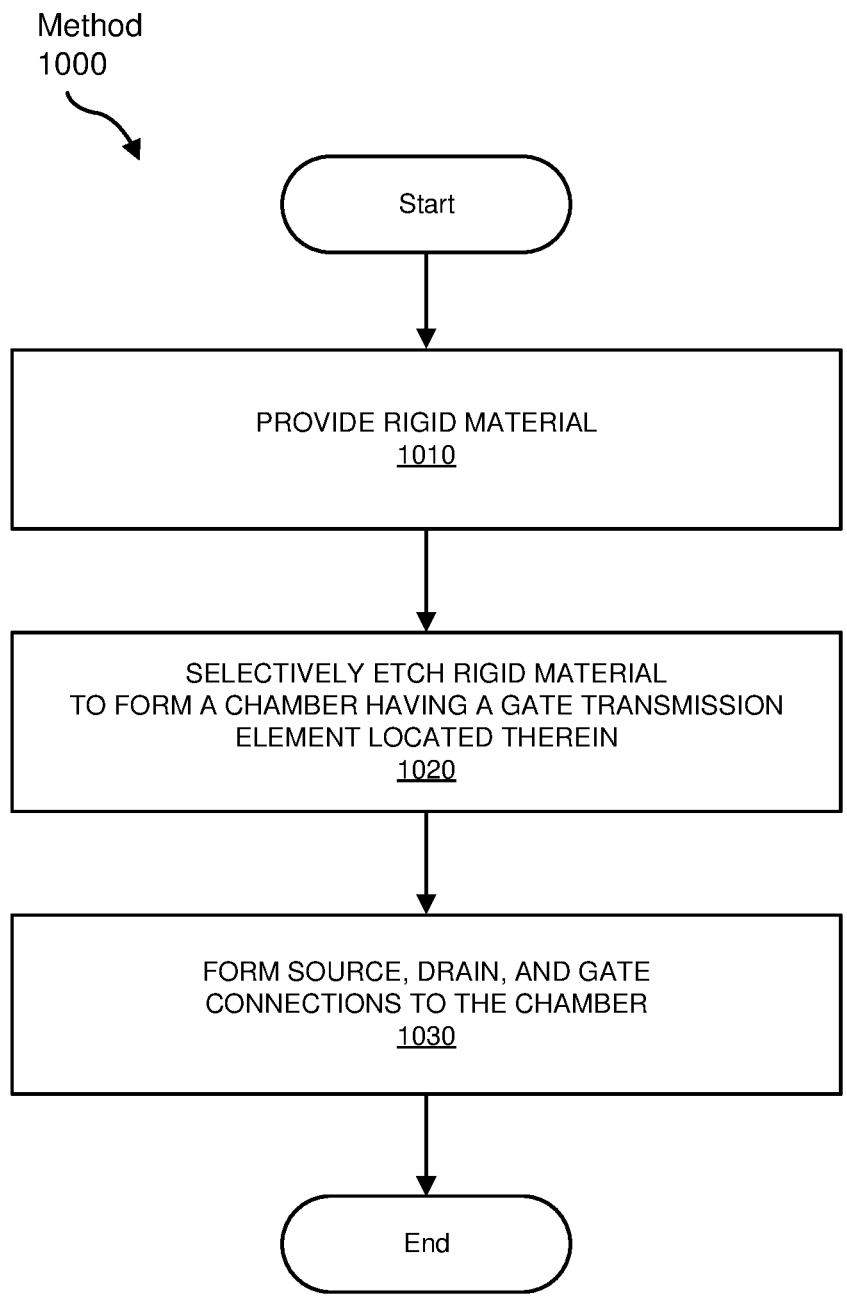
FIG. 10 illustrates a method of fabrication, in accordance with some embodiments.
Figure 11:
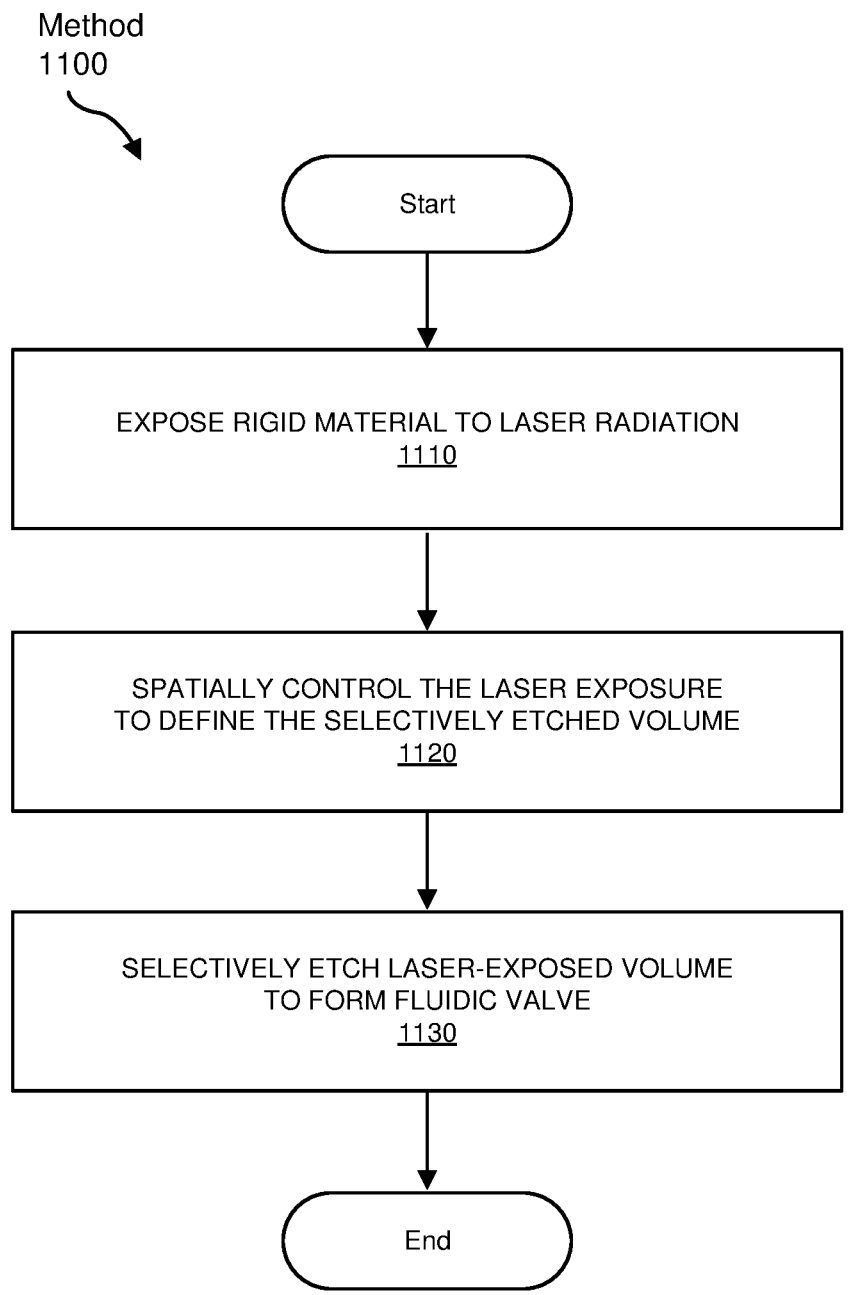
FIG. 11 illustrates a method of fabrication using laser etching, in accordance with some embodiments.
Figure 12:
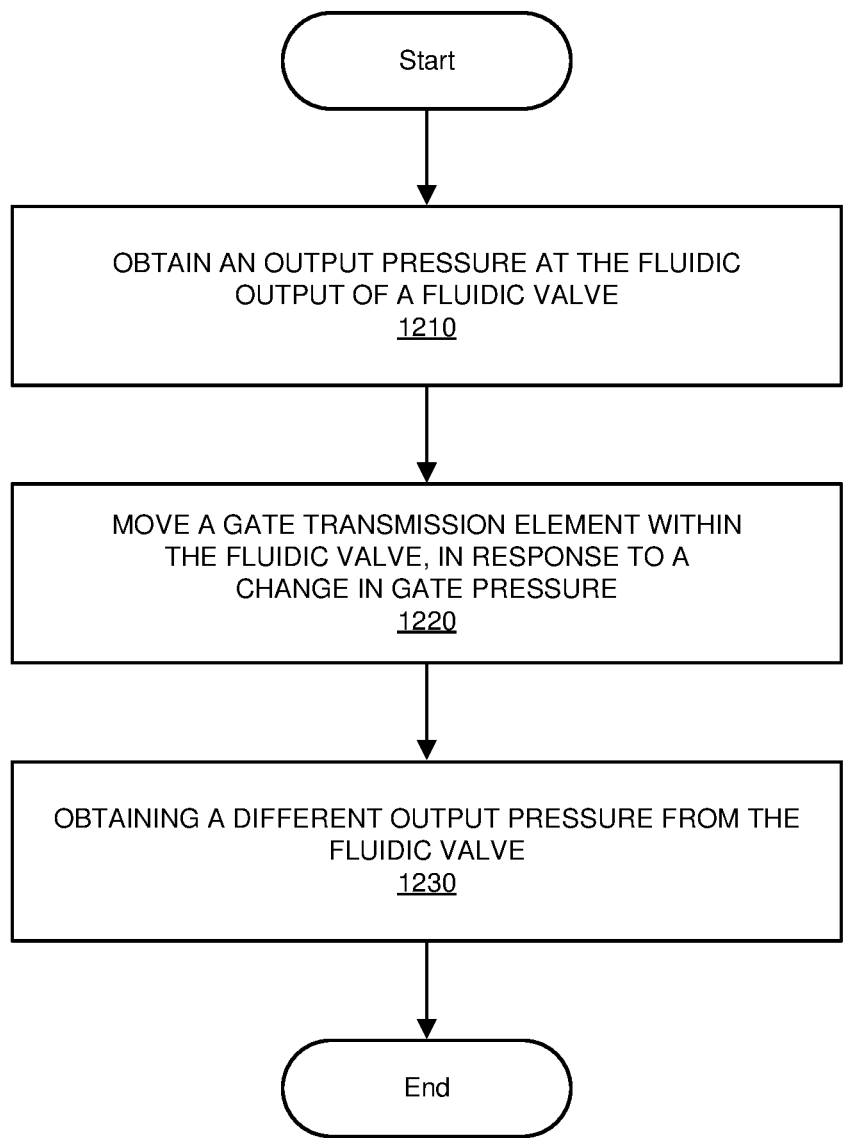
FIG. 12 illustrates a method in accordance with some embodiments.
Figure 13:
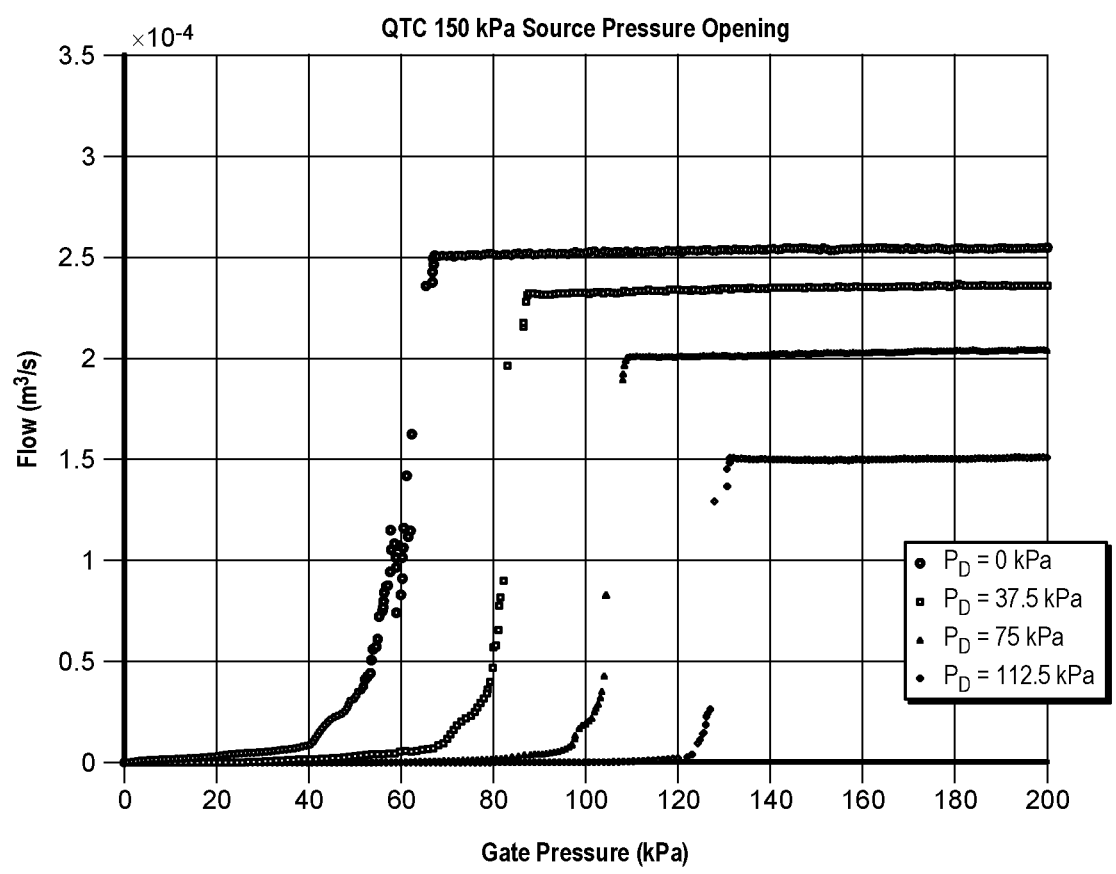
FIGS. 13 and 14 depict representative experimental data.
Figure 14:
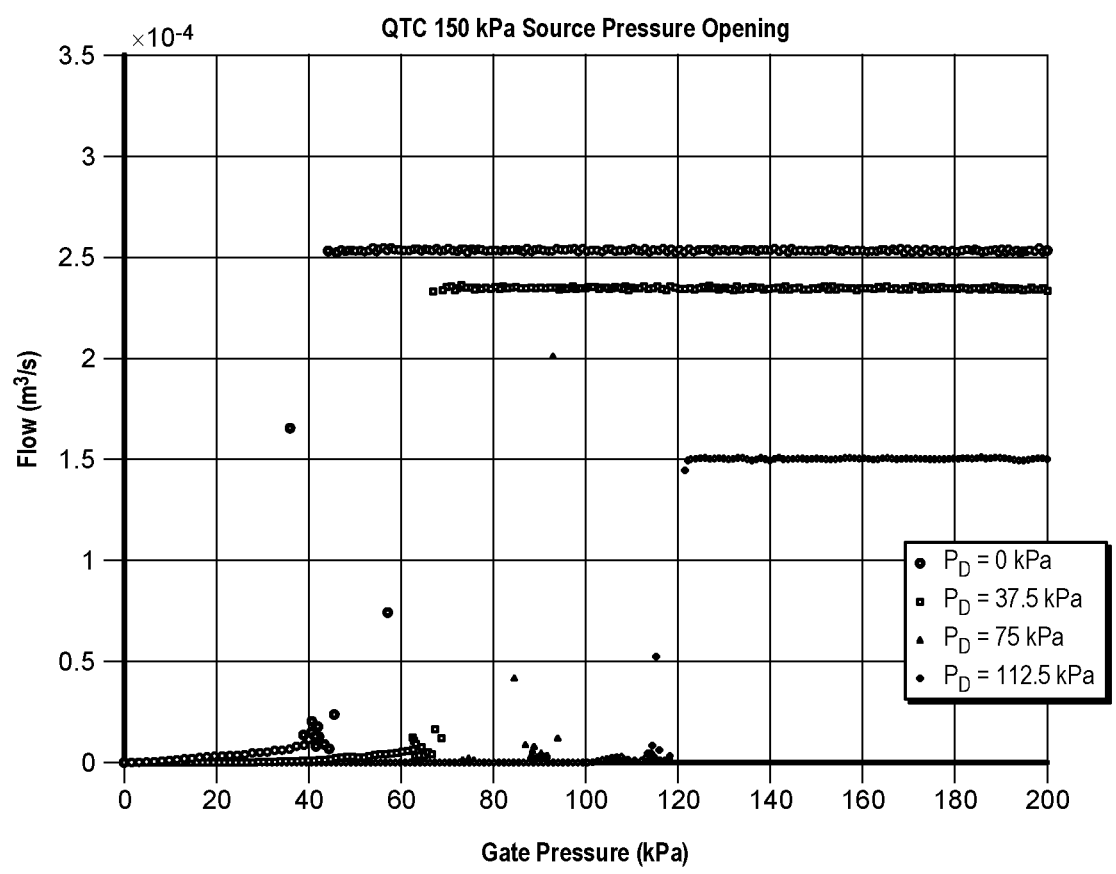

The following will provide, with reference to FIGS. 1A-20, detailed descriptions of example fluidic devices, including fluidic valves, fluidic circuits, applications of fluidic circuits, methods of operating fluidic circuits, and methods of fabricating fluidic devices, amongst other aspects. FIGS. 1A and 1B depict an example fluidic valve and a typical schematic representation. FIGS. 2A and 2B depict a flow diode, configured to allow flow in only one direction, in accordance with some embodiments. FIGS. 3-6 depict exemplary fluidic valves, including fluidic valves in some ways analogous to pFET and nFET type electronic devices. FIGS. 7, 8A, 8B, and 9 depict complementary type fluidic valves, which may also include a fluidic output. FIGS. 10-12 illustrate example methods, including methods of fabrication and operation. In some examples, a device may be fabricated using selective laser-induced etching (SLE). FIGS. 13-14 depict representative experimental data. FIGS. 15-20 depict representative augmented reality (AR) and virtual reality (VR) devices and systems, which may be configured in accordance with some embodiments.

In some examples, a device includes a body formed from a rigid body material, the body having a chamber. The device may include a fluidic source, a fluidic drain, a fluidic gate, and optionally a fluidic output, which may have respective fluid connections with the chamber. An example device may include a gate transmission element located within the chamber, and a position of the gate transmission element may be controllable between a first position and a second position using a gate pressure received through the fluidic gate.

In some examples, the gate transmission element is dimensioned to allow fluid to flow between the fluidic source and the fluidic drain when in the first position, and the gate transmission element is dimensioned to reduce or substantially prevent fluid from flowing between the fluidic source and the fluidic drain when in the second position. In some examples, the gate transmission element is dimensioned to allow fluid flow between the fluidic source and the fluidic output when in the first position, and the gate transmission element is dimensioned to allow fluid flow between the fluidic output and the fluidic drain when in the second position. In some examples, the output pressure at the fluidic output may be controlled based on the position of the gate transmission element.

In some examples, the gate transmission element may include a unitary glass element. In some examples, the body may be a unitary glass body.

In some examples, the gate transmission element may include a gate portion having a gate pressure receiving surface, and a closure portion having a closure surface. The gate portion and the closure portion may be mechanically interconnected, for example, by a connection member (which may be, e.g., an elongate connection member). In some examples, the closure surface and the connection member may be located on opposite sides of the closure portion, or in some examples, they may be located on the same side of the closure portion with the closure surface surrounding the connection member where it joins the closure portion.

The closure surface may be urged against an internal surface of the chamber by a gate pressure received through the fluidic gate when the gate transmission element is in the second position. The closure surface and a portion of the internal surface of the chamber may be conformal, and in some examples, both may be planar. The closure surface may move away from the internal surface as the gate transmission element moves from the second position to the first position.

FIGS. 1A-1B depict an example fluidic valve and an example fluidic schematic, respectively. Fluidic circuits may be represented by schematics as described in relation to FIG. 1B. Example fluidic devices may include fluidic diodes (e.g., one-way flow valves), as discussed below in relation to FIGS. 2A-2B, and fluidic valves as discussed in relation to FIGS. 3-9. Example fluidic devices may include fluidic circuits that may be based on various configurations of one or more fluidic valves. A fluidic amplifier circuit may also be configured as a fluidic oscillator, for example, by provision of feedback from a device output to a device input. Examples also include systems, such as haptic systems, augmented reality systems, and virtual reality systems, discussed herein, for example, in relation to FIGS. 15-20.

A fluidic amplifier stage may include one or more fluidic valves. An example fluidic valve includes a source, a gate, and a drain. In a fluidic valve, a flow rate from the source to the drain and/or a pressure between the source and the drain may be controlled by a gate pressure and/or a gate flow applied to the gate. A fluidic amplifier stage may include a fluidic resistor, which provides a flow impedance to a flow therethrough. A fluidic resistor may include one or more orifices. In some examples a fluidic input is applied to the gate of a fluidic valve, for example, through a fluid channel and an input fluid resistor, and a fluidic output is obtained between the fluidic valve and a fluidic resistor.

FIG. 1A is an illustration of an exemplary fluidic control system that may be used in connection with embodiments of this disclosure, which may be termed a fluidic valve. Examples of the present disclosure may include fluidic devices, systems, and methods that involve the control (e.g., stopping, starting, restricting, increasing, etc.) of fluid flow through a fluid channel. A fluid channel may sometimes be referred to as a conduit. The control of fluid flow may be accomplished with a fluidic valve. FIG. 1A shows a schematic diagram of a fluidic valve 10 for controlling flow through a fluid channel 16, according to at least one embodiment of the present disclosure. Fluid from a fluid source (e.g., a pressurized fluid source, a fluid pump, etc.) may flow through the fluid channel 16 from an inlet port 12 to an outlet port 14, which may be operably coupled to, for example, a fluid-driven mechanism, another fluid channel, or a fluid reservoir. In some examples, an inlet port may be referred to a fluidic valve source (or "source"), and an outlet port may be referred to as a fluidic valve drain (or "drain").

Fluidic valve 10 may include a gate 20 for controlling the fluid flow through fluid channel 16. Gate 20 may include a gate transmission element 22, which may be a movable component that is configured to transmit an input force, pressure, or displacement to a restriction region 24 to restrict or stop flow through the fluid channel 16. Conversely, in some examples, application of a force, pressure, or displacement to gate transmission element 22 may result in opening restriction region 24 to allow or increase flow through the fluid channel 16. The force, pressure, or displacement applied to gate transmission element 22 may be referred to as a gate force, gate pressure, or gate displacement. Gate transmission element 22 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

In some examples, a gate transmission element may be referred to as a "valve." For example, a gate transmission element may include a piston or other mechanical component having a gate surface that receives the gate pressure over a gate pressure area (the effective area of the gate surface that receives the gate pressure). In some examples, the resultant force on the gate transmission element (such as a piston) may act to close a fluidic valve. In some examples, the resultant force of the gate transmission element may act to open a fluidic valve.

In some examples, a fluidic valve may be normally open, in which example a gate force may be needed to close the fluidic valve. In some examples, a fluidic valve may be normally closed, in which example a gate force may be needed to open the fluidic valve. A gate force may be a resultant gate force, resulting from, for example, one or more pressures acting on areas of a gate transmission element.

As illustrated in FIG. 1A, gate 20 of fluidic valve 10 may include one or more gate terminals, such as an input gate terminal 26(A) and an output gate terminal 26(B) (collectively referred to herein as "gate terminals 26") on opposing sides of gate transmission element 22. Gate terminals 26 may be elements for applying a force (e.g., pressure) to gate transmission element 22. By way of example, gate terminals 26 may each be or include a fluid chamber adjacent to gate transmission element 22. Alternatively or additionally, one or more of gate terminals 26 may include a solid component, such as a lever, screw, or piston, that is configured to apply a force to gate transmission element 22.

In some examples, a gate port 28 may be in fluid communication with input gate terminal 26A for applying a positive or negative fluid pressure within the input gate terminal 26A. A control fluid source (e.g., a pressurized fluid source, a fluid pump, etc.) may be in fluid communication with gate port 28 to selectively pressurize and/or depressurize input gate terminal 26A. In additional embodiments, a force or pressure may be applied at the input gate terminal 26A in other ways, such as with a piezoelectric element, flexoelectric element, an electromechanical actuator, or the like.

In the embodiment illustrated in FIG. 1A, pressurization of the input gate terminal 26A may cause the gate transmission element 22 to be displaced toward restriction region 24, resulting in a corresponding pressurization of output gate terminal 26B. Pressurization of output gate terminal 26B may, in turn, cause restriction region 24 to partially or fully restrict to reduce or stop fluid flow through the fluid channel 16. Depressurization of input gate terminal 26A may cause gate transmission element 22 to be displaced away from restriction region 24, resulting in a corresponding depressurization of the output gate terminal 26B. Depressurization of output gate terminal 26B may, in turn, cause restriction region 24 to partially or fully expand to allow or increase fluid flow through fluid channel 16. Thus, gate 20 of fluidic valve 10 may be used to control fluid flow from inlet port 12 to outlet port 14 of fluid channel 16.

FIG. 1B shows a schematic diagram of an example fluidic circuit including a fluidic valve, such as the fluidic valve illustrated in FIG. 1A. The fluidic circuit 30 may include a circuit source pressure $P_{SS}$ 32, flow controller 34, fluidic valve 36 having a source 38, gate 40, and drain 42. The source 38 may be connected to the flow controller 34. Drain 42 may be connected to the fluidic ground 46, represented by an inverted triangle. Fluidic ground 46 may be at a lower pressure, and may be at ambient pressure and may be a negative pressure. The input pressure $P_{In}$ may be received at inlet 44, in this example the gate inlet connected to gate 40. The output pressure $P_{Out}$ may be obtained at outlet 48, which may be obtained between the source 38 of the fluidic valve and the flow controller 34.

In relation to the example fluidic valve described in FIG. 1A, the fluidic source 38 corresponds to the inlet port 12 of the fluidic valve, into which fluid flows. The fluidic drain 42 corresponds to the outlet port 14 of the fluidic valve. The fluidic gate 40 corresponds to a port connected to gate 20 of the fluidic valve 10 of FIG. 1A.

In the schematic diagram of FIG. 1B, the solid lines may represent fluid channels, such as conduits, through which fluid may flow. A fluid channel may be provided by a tube, conduit, pipe, or other channel through which fluid may flow or through which fluid pressure may be conveyed. The fluid pressure tends to decrease going downwards through the figure (as illustrated). As typically illustrated in fluidic schematic diagrams, fluid flows from the circuit source pressure (typically drawn at or near the top of the schematic) to the fluidic ground (typically drawn at or near the bottom of the schematic). The rate of fluid flow through the fluidic valve 36 may be controlled by an input pressure applied to the gate 40 of the fluidic valve. The flow controller 34 may include a restriction, such as one or more orifices having a reduced cross-sectional area compared with the fluid channels. In some examples, a flow restriction may be illustrated by a zig-zag line. In some examples, fluidic ground may also be referred to as the circuit drain, as fluid flows out of the circuit through the circuit drain to the fluidic ground. In some examples, a pump may recirculate fluid from the circuit drain at a relatively low pressure to the circuit source at a relatively high pressure. In the schematic of FIG. 1B, the symbol used to represent a fluidic valve has an exterior circle. This circle is optional in schematic representations.

FIGS. 2A and 2B depict an example membraneless fluidic diode, that is configured to allow flow in one direction only. FIG. 2A shows the example fluidic diode including a first (upper, as illustrated) flow channel 210 and a second (lower, as illustrated) flow channel 208 formed within a body 200. A gate transmission element 204, in this example including a disk, is located, at least in part, within an upper portion of a chamber 202 formed within the body. The chamber 202 additionally includes a lower portion 206 (in this example, a lower cylindrical portion having a radius less than that of the gate transmission element 204) along with the upper portion of the chamber 202 (in this example, an upper cylindrical portion having a radius greater than that of the transmission element).

When flow is directed from the upper flow channel 210 to the lower flow channel 208 (downwards, in FIGS. 2A and 2B), the gate transmission element 204 rests against the top of the lower cylindrical portion of the chamber 202. The overlap between the periphery of the lower surface of the transmission element and the interior surface of the chamber 202 seals the lower flow channel 208 from the upper flow channel 210. Hence, the transmission element prevents a downwards flow in the illustrated device.

However, if flow is directed upwards in the device of FIGS. 2A and 2B, the transmission element 204 is lifted within the upper portion of the chamber 202. Seal-prevention structures 212 (shown more clearly in FIG. 2B) within the upper portion of the chamber 202 prevent the transmission element 204 from forming a seal with an upper interior surface of the upper chamber, and prevent the upper flow channel 210 from being sealed off from the chamber and hence from the lower flow channel 208. Hence, the device allows upwards flow (as illustrated), from the lower flow channel 208 to the first upper flow channel 210, and the device functions as a flow diode, allowing flow in only one direction (upwards, as illustrated).

A device, such as the device illustrated in FIGS. 2A and 2B, may include a body formed from a rigid material, such as a rigid inorganic material, such as a glass, such as fused silica. In some examples, the body is a monolithic glass or ceramic body, and may include a glass, such as fused silica. In some examples, the transmission element may be a unitary glass element, for example, formed as (or from) a monolithic piece of glass or ceramic. A fluidic valve may include a body including a chamber, and a gate transmission element located within the chamber. In one position, a closure surface of the gate transmission element may form a seal with an internal surface of the chamber. For example, the closure surface and the internal surface of the chamber (where the closure surface contacts the internal surface) may be conformal, and in some examples the closure surface and the internal surface of the chamber (where the closure surface contacts the internal surface) may both be planar.

Figure 3:
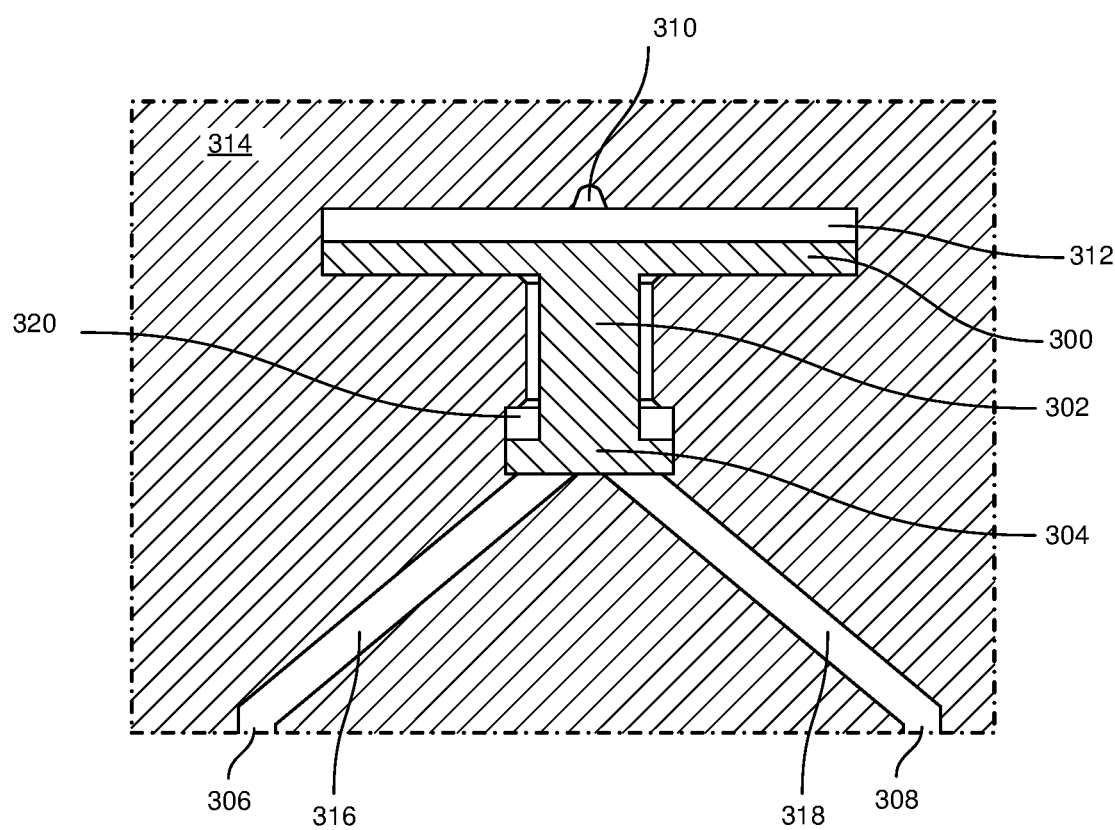
FIG. 3 depicts a pFET type fluidic valve, in accordance with some embodiments.

FIG. 3 shows an example fluidic valve including a gate transmission element 302 (including gate pressure receiving portion 300 and closure portion 304), located within a chamber 312 formed within body 314. A fluidic source 306 receives fluid, which may be conveyed by a source connection 316 to a lower portion 320 of the chamber 312. A fluidic drain 318 may convey fluid away from the chamber 312 to by a drain connection to the fluidic drain 308. As shown, the gate transmission element 302 is urged downwards by gate pressure (the pressure being conveyed by gate fluid received through fluidic gate 310 (which may in some examples be the opening of a gate connection with the fluidic gate) into the chamber 312, so that a planar closure surface on the underside of closure portion 304 contacts a planar portion of the interior surface of the chamber. This contact closes the fluid connection between the fluidic source 306 and the fluidic drain 308. Reducing or lowering the gate pressure allows the source pressure acting on the underside of the closure portion 304 to urge the gate transmission element 302 upwards, opening the valve. The device may be considered as a fluidic analog of an electronic pFET device. The figure may represent a cross-section through cylindrical elements (e.g., cylindrical portions of the gate transmission element 302 having different radii, and cylindrical portions of the chamber 312 having different radii), and through the source and drain connections 316 and 318, respectively. The gate transmission element may be sized to allow a flow path around the gate transmission element to increase the pressure drop across the gate transmission element. The devices discussed in relation to FIG. 3, and also below in relation to FIG. 4, may be referred to as "pFET" devices, by analogy to electronic components.

In some examples, a fluidic valve such as the valve illustrated in FIG. 3, may have a monolithic rigid body, a chamber formed therein, a rigid gate transmission element located within the chamber, a fluidic gate, a fluidic source, and a fluidic drain. The device may be configured so that the gate transmission element may be urged by a gate pressure received by the fluidic gate into a position where the gate transmission element blocks a fluid path between the fluidic source and the fluidic drain. The gate transmission element may have a gate pressure receiving surface, subject to the gate pressure received through the fluidic gate, and a closure surface, which is urged towards an interior surface portion of the chamber by the gate pressure so as to close a fluid path, through the chamber, between the fluidic source and the fluidic drain. The gate transmission element may be configured to allow a fluid path between the fluidic source and the fluidic drain, for example, on reduction of the gate pressure. The monolithic rigid body may include a glass, such as a silica glass, such as fused silica. The gate transmission element may include a glass and/or a ceramic, such as a silica glass, such as fused silica. Closure of the fluid path between the fluidic source and the fluidic drain may include contact between a closure surface of the gate transmission element and a portion of the interior surface of the chamber. In some examples, the closure surface and the portion of the interior surface may both include a glass and/or a ceramic material, such as a glass, such as fused silica.

In some examples, fluid received by the fluidic gate (which may be termed gate fluid) may leak around the gate transmission element, even when the closure surface is in contact with an internal surface of the chamber. This may be used to obtain a pressure drop across the gate transmission element. A device may be configured to provide a passive leakage of gate fluid around the gate transmission element. This passive leakage of fluid generates a pressure drop across the gate transmission element, which may be useful during the transition between states to avoid the pressure equalizing on the two sides of the gate transmission element, which may prevent further motion of the gate transmission element. The passive leakage may not be particularly desirable once the closure surface contacts the interior surface of the chamber (e.g., in a steady state), but may be tolerable.

Figure 4:
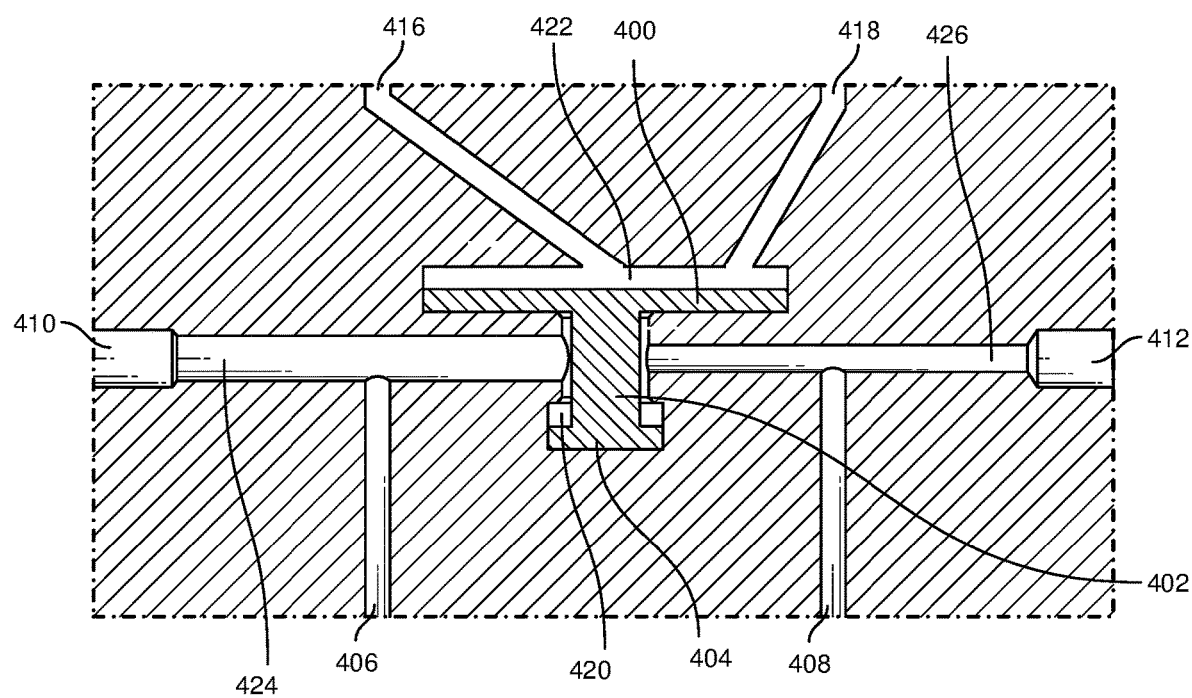
FIG. 4 depicts a pFET type fluidic valve, in accordance with some embodiments.

FIG. 4 shows an example fluidic valve, which may include the aspects of FIG. 3 discussed above. The figure illustrates a cross-section of a portion of a device, which may be formed in a monolithic rigid material. The fluidic source and fluidic drain connections are not shown, but may be configured as shown above in FIG. 3. The device includes a gate transmission element 402 (including a gate pressure receiving portion 400 and a closure portion 404), a first vent 410, a second vent 412, a fluidic gate 416, a static fluidic gate 418 (which is optional), and a chamber 420. Fluid may flow from the fluidic source, through a source connection to a lower portion of the chamber 420, and out of a fluidic drain through a drain connection with the chamber 420, for example, using a configuration as illustrated in FIG. 3. The gate transmission element 402 may be urged downwards by a combination of gate pressure received by the fluidic gate 416 and conveyed to an upper portion 422 of the chamber 420, and the gate static pressure received by the static fluidic gate 418. Channels 406 and 408 may be connected to pressure sensors, for example, for device evaluation, and these channels may be omitted. First and second vent connections 424 and 426, respectively, were fabricated with different internal diameters to evaluate the effect of the vents. If an example device is fabricated with a vent, only one vent is required.

In some examples, the static fluidic gate pressure may be selected so that a relatively small increase in gate pressure may urge the gate transmission element downwards. This allows a fluid connection between the fluidic source and the fluidic drain, at least in part through a lower portion of the chamber 420. The gate static pressure may be adjusted to adjust the threshold gate pressure required to move the gate transmission element. In some examples, the fluid static gate may be used to connect to a pressure sensor. In some examples, the static fluidic gate may be omitted entirely.

A pressure drop across the gate pressure receiving portion 400 (in this example, a portion, which may be in the form of a disk, of the gate transmission element 402) was obtained by allowing flow during the transition, using at least one vent channel in fluid connection with the chamber. The figure shows two vent channels (406 and 408). During experimental evaluation, either one of these two vent channels was selected (e.g., opened to ambient pressure) to test the effects of the selected vent channel. Experimental data showed that selecting a larger vent channel cross-sectional area increased the gain of the device, due to the larger pressure drop developed across the gate pressure receiving portion 400 of the gate transmission element 402.

Figure 5A:
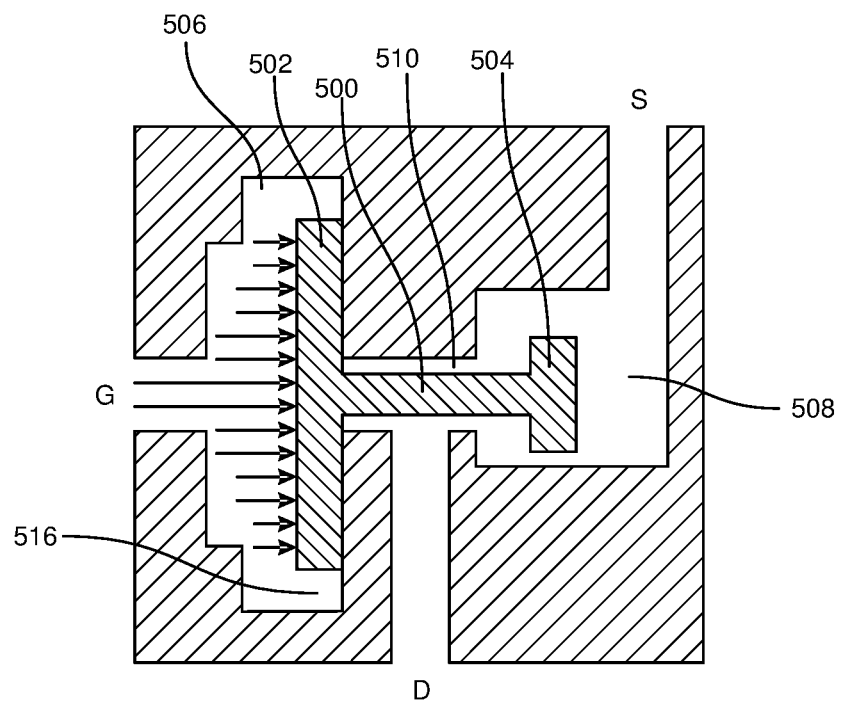
FIGS. 5A and 5B depict an nFET type fluidic valve, in accordance with some embodiments.
Figure 5B:
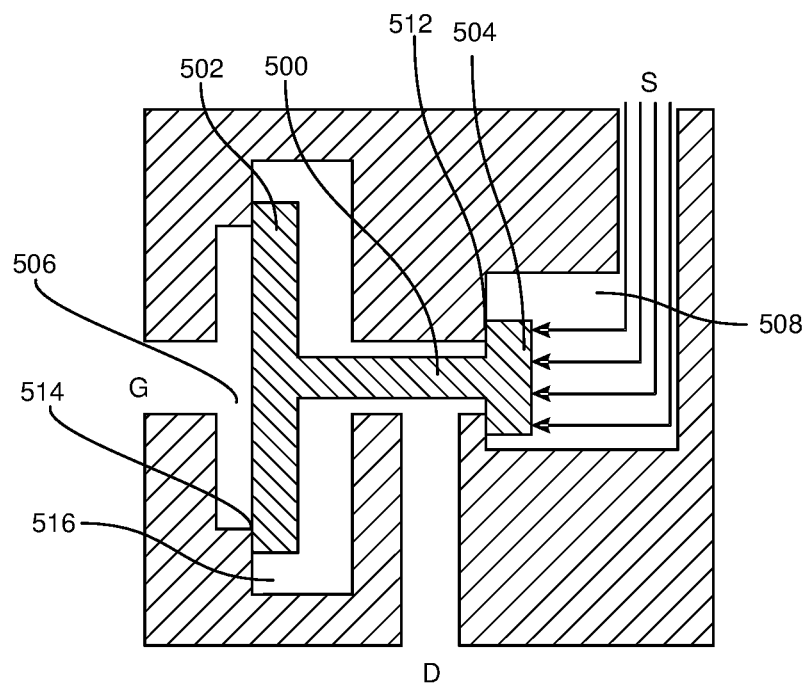

FIGS. 5A and 5B illustrate a further example fluidic valve. The device includes a gate transmission element 500, that includes two interconnected portions, a gate pressure receiving portion 502 and closure portion 504. The gate transmission element 500 is located within a chamber, including a gate portion 506 of the chamber (in which the gate pressure receiving portion 500 is located), and a closure portion 508 of the chamber (in which the closure portion 504 is located). The two portions of the chamber (506 and 508) are interconnected through a chamber interconnection portion 510, and the gate transmission element 500 extends through the chamber interconnection portion 510.

The device includes a fluidic gate (here denoted "G"), a fluidic source (denoted "S"), and a fluidic drain (denoted "D"), all in fluid communication with the chamber or a portion thereof through a respective connection. The figure shows the gate pressure (denoted by multiple arrows) urging the gate transmission element 500 to a position on the right, which allows a fluidic connection between the fluidic source and the fluidic drain.

FIG. 5B shows the gate pressure reduced or removed, so that the source pressure (denoted by multiple arrows) overcomes the gate pressure and urges the gate transmission element 500 to a position on the left (as illustrated in FIG. 5B). In this position, a surface of the closure portion 504 (which may be termed as the closure surface) is urged against a portion of the internal surface of the chamber (at 512). This closes the fluid connection between the fluidic source and the fluidic drain through the chamber. This configuration may be considered as the fluidic analog of an electronic nFET device, as an appreciable gate pressure is required to overcome the source pressure, move the gate transmission element to the right, and open the fluid connection between the fluidic source and fluidic drain. The device may be referred to as an "nFET" device, by analogy to the electronic components. Further, devices may show excellent channel sealing and low gate leakage, and may eliminate tolerance stack-up issues along the direction of travel of the gate transmission element. In some examples, the left surface 514 (the gate pressure receiving surface) of the gate transmission element 502 does not seal the gate (G) closed when the gate transmission element is in the left position shown in FIG. 5B. For example, a lower gate pressure may allow source pressure to move the gate transmission element to the left, but the contact shown at 514 need not occur. For example, the contact shown at 514 may effectively reduce the gate pressure receiving area and increase the gate pressure required to move the gate transmission element to the right. In some examples, the only surface portion of the gate transmission element that contacts an interior surface of the chamber is the surface portion that seals off the source (shown at 512). In other examples, both surfaces of the gate transmission element may contact interior surfaces of the chamber simultaneously. However, only requiring one surface portion of the gate transmission element to contact the interior surface of the chamber may improve manufacturability, decrease the likelihood of a leak through the source when the gate pressure is low, and help eliminate tolerance stack-up issues. The clearance 516 around the periphery of gate pressure receiving portion of the gate transmission element may be shown as greatly exaggerated in FIGS. 5A and 5B. In some examples the clearance 516 may be relatively narrow to maintain an appreciable pressure difference across the gate pressure receiving portion.

Figure 6:
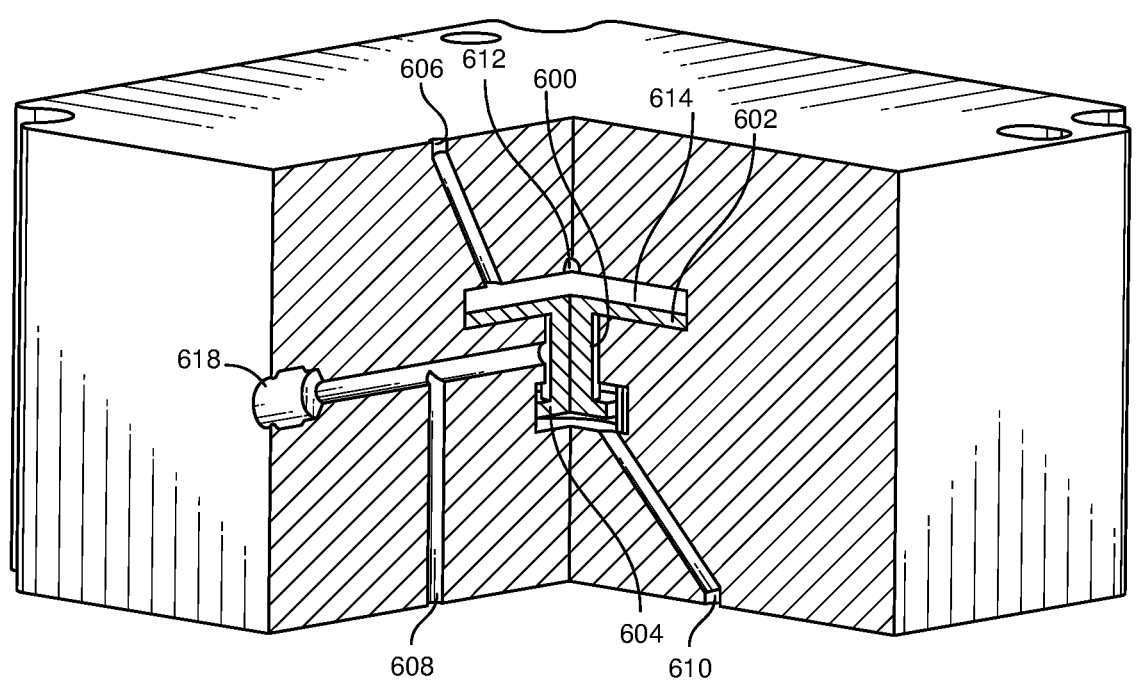
FIG. 6 depicts an nFET type fluidic valve, in accordance with some embodiments.

FIG. 6 shows an example fluidic valve. The device includes a gate transmission element 600, including a gate pressure receiving portion 602 and a closure portion 604, located within a chamber 614. The device includes a fluidic gate (with a channel opening into the chamber at 614), a static fluidic gate 606, a fluidic source 610, and a fluidic drain 608. A pressure sensor connection 618 may optionally connect to a pressure sensor, if desired, for device evaluation. In some examples, the fluidic drain and pressure sensor connections may be switched, and the pressure sensor connection may be omitted. The static fluidic gate 606 may be used to apply a static bias pressure to the gate, around which the gate pressure may be varied by varying the pressure applied through the fluidic gate 612. The figure shows the gate transmission element 600 depressed by gate pressure acting on the gate pressure receiving portion 602, allowing a fluid connection through the chamber between the fluidic source 610 and the fluidic drain 608.

A fluidic device, such as illustrated in FIGS. 5A-5B, or FIG. 6, may be considered as the fluidic analog of an electronic nFET device, as an appreciable gate pressure may be required to open the fluid connection between the fluidic source and the fluidic drain through the chamber. In some examples, the device may be fabricated from a monolithic rigid body, which may include glass or ceramic. In some embodiments, the body is a glass body, such as a fused silica body.

Figure 7:
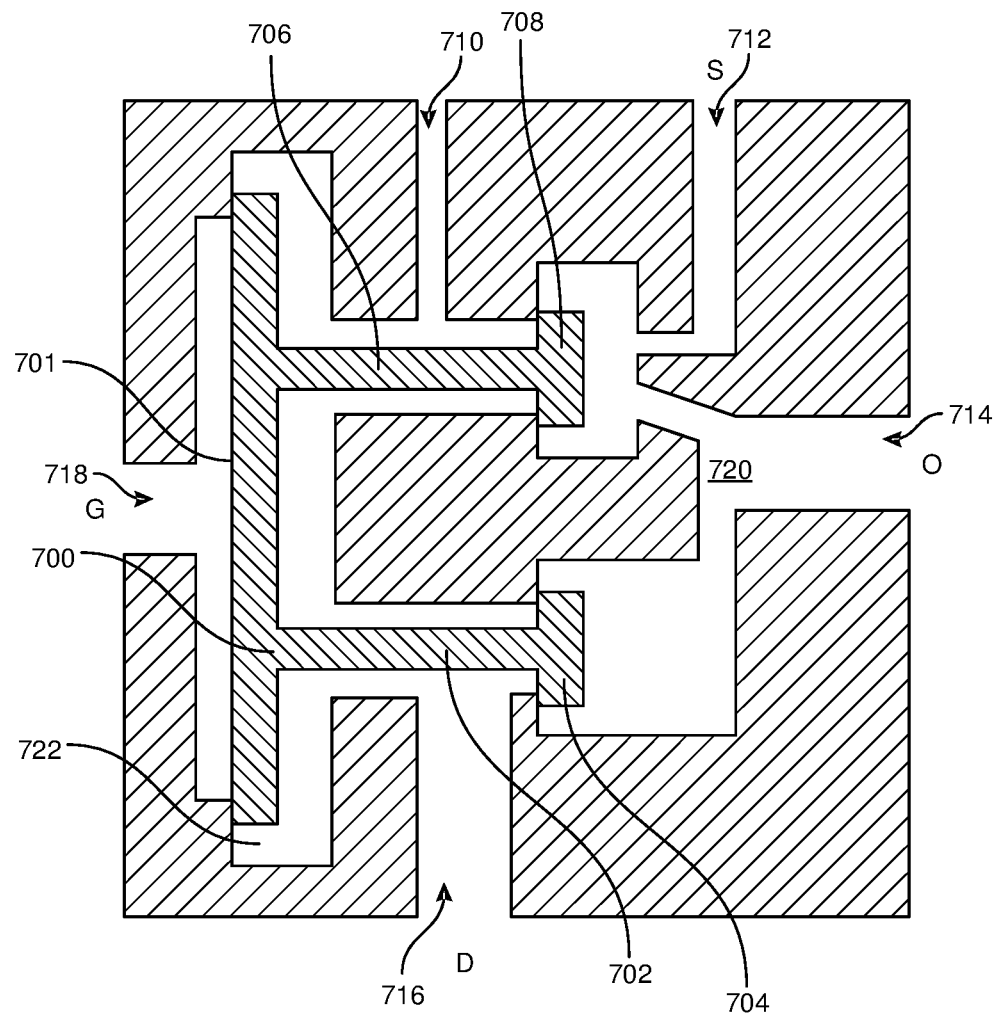
FIG. 7 depicts a complementary type fluidic valve, in accordance with some embodiments.

FIG. 7 shows an example fluidic valve that combines the functionality of a fluidic pFET and a fluidic nFET in a single package, which may be referred to as a complementary inverter. The device may be considered as including an upper and a lower fluidic valve, effectively integrated into a single fluidic valve, as discussed in more detail below. The device includes a fluidic output 714, denoted "O", from which a fluidic output may be obtained, located between a fluidic source 712 (denoted "S"), a fluidic drain 716 (denoted "D"), and a fluidic gate 718 (denoted "G"). A channel 720 effectively provides the fluidic drain for the upper fluidic valve, connects to the fluidic output 714, and then provides the fluidic source for the lower fluidic valve. The device includes a gate transmission element 700 that has a common gate pressure receiving portion 701. An upper connection member 706 extends to an upper closure portion 708. A lower connection portion 702 extends to a lower closure portion 704. In the configuration shown, the gate transmission element 700 is located in a first (left, as illustrated) position, allowing a fluid connection between the fluidic source 712, the channel 720 that acts as the fluidic drain for the upper fluidic valve, and the fluidic output 714. The lower closure 704 portion blocks the fluid connection between the channel 720 (acting as the source for the lower fluidic valve) and the fluidic drain 716. Hence, the upper fluidic valve is effectively open, the lower fluidic valve is effectively closed, and the output pressure at the fluidic output 714 is relatively high, because of the connection between the fluidic source and the fluidic output. The clearance 722 around the periphery of gate pressure receiving portion of the gate transmission element may be greatly exaggerated in this schematic. In some examples, this clearance may be relatively narrow to maintain an appreciable pressure difference across the gate pressure receiving portion.

The gate transmission element may then move to the right under the application of sufficient gate pressure applied through the fluidic gate 718, to a second position (to the right of the position illustrated) in which the closure portion 708 blocks the fluid connection between the fluidic source 712 and the channel 720, and opens the fluid connection between the channel 720 and the fluidic drain 716. Hence, the fluid connection between the fluid source 712 and the fluidic output 714 is closed, and the fluid connection between the fluidic output 714 and the fluidic drain 716 is open. In this case, the upper fluidic valve is effectively closed, the lower fluidic valve is effectively open, and the output pressure is relatively low. Hence, this fluidic device may function as an inverting fluidic amplifier, in which, for example, a high pressure input to the fluidic gate 718 may induce a low pressure output at the fluidic output 714, and vice versa.

Figure 8A:
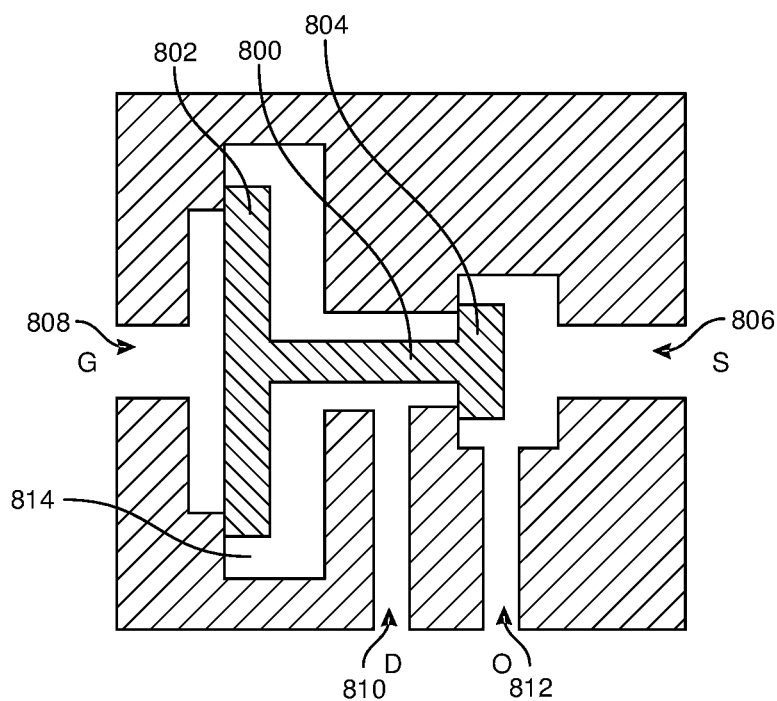
FIGS. 8A and 8B depict a complementary type fluidic valve, in accordance with some embodiments.
Figure 8B:
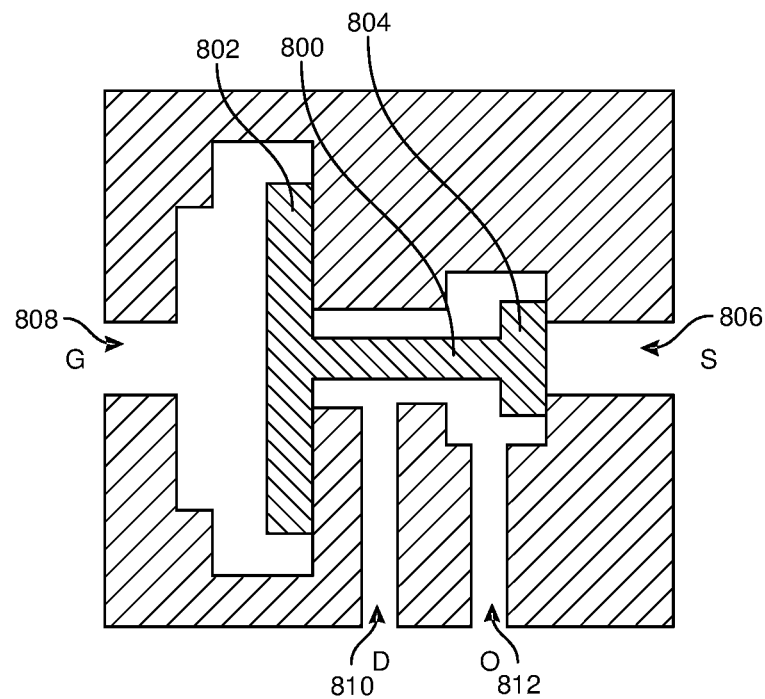

FIGS. 8A and 8B show another example configuration of a fluidic valve. FIG. 8A shows a device including a gate transmission element 800 including a gate pressure receiving portion 802 and a closure portion 804. The device has a fluidic source 806, a fluidic output 812, a fluidic drain 810, and a fluidic gate 808. The gate transmission element 800 is shown in a position where the closure portion 804 blocks the fluid connection between the fluidic output 812 and the fluidic drain 810, and allows a fluid connection between the fluidic source 806 and the fluidic output 812. In this position, the fluidic output is at a relatively high pressure, which may be similar to that of the fluidic source.

FIG. 8B shows the gate transmission element in a second position, to the right of that shown in FIG. 8A. In this position, the closure portion 804 of the gate transmission element 800 blocks the fluid connection between the fluidic output and the fluidic source, and allows a fluid connection between the fluidic output and the fluidic drain. In this configuration, the fluidic output is at a relatively low pressure, which may be similar to that of the fluidic drain. The clearance 814 around the periphery of gate pressure receiving portion of the gate transmission element may greatly exaggerated in this figure. In some examples the clearance 814 may be relatively narrow to maintain an appreciable pressure difference across the gate pressure receiving portion, for example, during switching of the device.

Figure 9:
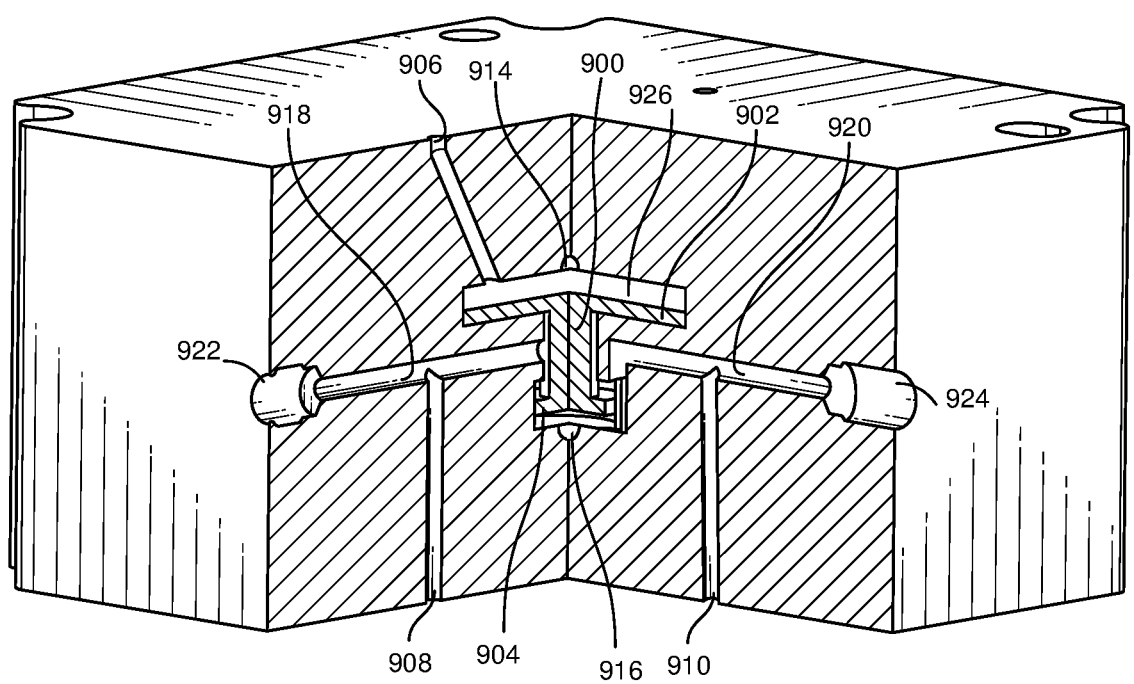
FIG. 9 depicts a complementary type fluidic valve, in accordance with some embodiments.

FIG. 9 shows an example device, such as a fluidic valve, including a fluidic source 916, fluidic drain 908, fluidic output 910, fluidic gate 914, and static fluidic gate 906. The device further includes a gate transmission element 900 including a gate pressure receiving portion 902 and a closure portion 904. The gate transmission element 900 is located within a chamber 926. In the illustrated configuration, the combination of the gate pressure received through the fluidic gate 914, and the static gate pressure received through the static fluidic gate 906, may act to urge the gate transmission element 900 downwards, blocking the fluid connection between the fluidic source 916 and the fluidic output 910. The chamber 926 is configured to allow a fluid connection between the fluidic output 910 and the fluidic drain 908, and hence the fluidic output pressure is relatively low. An optional pressure sensor may also be included. In some examples, the indicated fluidic drain may be used as a pressure sensor line, and an additional connection may be used as the fluidic drain.

By reducing the gate pressure, the gate transmission element 900 may move upwards to a second position, which allows a fluid connection between the fluidic source 916 and the fluidic output 910, while blocking the connection between the fluidic output 910 and the fluidic drain 908. In this configuration, the upper surface of the closure portion 902 may contact a portion of the inner surface of the chamber 926, around the upper periphery of the closure portion 902. The additional channels shown at 918 and 920 may be connected to pressure sensors through respective connectors 922 and 924, for example, for device evaluation, testing, calibration, and/or quality monitoring.

In some examples, the closure portion (such as a closure surface thereof) may be urged against an internal surface of the chamber by a change in gate pressure received through the fluidic gate. In some examples, an increase in gate pressure may allow the gate pressure to urge the closure portion against an interior surface of the chamber. In some examples, a decrease in gate pressure may allow another pressure, such as a source pressure, to urge the closure portion against an interior surface of the chamber. In some examples, the closure surface and the internal surface of the chamber are conformal (e.g., for the portions of the respective surfaces that contact each other), and in some examples both may be planar. The closure surface may move away from the internal surface of the chamber as the gate transmission element moves from, for example, the second position to the first position. The gate transmission element may include a gate portion having a gate pressure receiving surface (which may also be referred to as the gate surface), and a plurality of connecting members extending from the gate portion, wherein each connecting member has a closure portion located at a distal end, each closure portion having a closure surface.

Devices, such as those illustrated in FIGS. 7-9, may sometimes be referred to as "cFET" fluidic valve designs, by analogy to the electronic components. In some examples, a "cFET" type fluidic device may configured as an inverter (e.g., the devices shown in FIGS. 7 and 9), and an inverter configuration device may also be used as a fluidic buffer (sometimes referred to as a buffer amplifier) by swapping the fluidic source and drain connections. Configured as a fluidic buffer, gain amplification from the gate transmission element may be slightly reduced compared with use as an inverter. A device similar to that shown in FIG. 9 may be operated as a fluidic buffer by using, for example, the connection at 908 as a fluidic source and the connection at 916 as a fluidic drain. Experiments showed that the device of FIG. 9 may be successfully used as a fluidic buffer.

In some examples, a device includes a body formed from a rigid body material, the body including a chamber, a fluidic source having a source connection with the chamber, a fluidic drain having a drain connection with the chamber, and a fluidic gate having a gate connection with the chamber, and a gate transmission element located within the chamber, wherein a position of the gate transmission element is controllable between a first position and a second position using a gate pressure received through the fluidic gate, there is a fluid connection between the fluidic source and the fluidic drain when the gate transmission element is in a first position, and there is no appreciable fluid connection between the fluidic source and the fluidic drain when the gate transmission element is in a second position.

In some examples, the gate transmission element may be a unitary glass element. In some examples, the body is a unitary glass body. In some examples, the gate transmission element may be a unitary glass element enclosed within a chamber within a unitary glass body. In some examples, the same etching process used to form the chamber may also be used to form the gate transmission element in situ within the chamber. The gate transmission element may include a gate portion having a gate pressure receiving surface, and a closure portion having a closure surface. The gate transmission element may further include a connection member, mechanically interconnecting the gate portion and the closure portion.

In some examples, the closure surface (e.g., that part of the surface that may contact the inner portion of the chamber) and the connecting member may be located on opposite sides of the closure portion. In some examples, the closure surface and the connecting member may be located on the same side of the closure portion, and the closure surface may surround the connection between the closure portion and the connection member.

In some examples, the gate pressure receiving surface (which may also be termed a gate surface) has a gate surface area, and the closure surface has a closure area. In this context, the closure area may be a surface area over which a closure pressure (such as, for example, a source pressure) resists the gate pressure. The gate pressure area may be appreciably greater than the closure area, for example, at least double the closure pressure area. This may allow pressure gain in the device. The term "closure pressure" is used here to refer to a pressure that opposes the gate pressure, and this pressure may also (or alternatively) be referred to as, for example, an opposition pressure in examples where the opposition pressure does not act to close the fluidic valve.

Pressure gain may be obtained in example configurations in which a relatively small gate pressure may be used to control a relatively larger pressure, such as a relatively large source pressure. The force exerted by any particular pressure may be expressed as the product of the pressure and the area over which it acts. Hence, the force obtained from the particular pressure may be increased by receiving the particular pressure over a larger surface area. Hence, increasing the gate pressure area allows a relatively small gate pressure to control other relatively larger pressures.

In some examples, the gate transmission element may include a gate portion, having a gate pressure receiving surface, and a plurality of connection members extending from the gate portion, wherein each connection member has a closure portion located at a distal end, and each closure portion having a closure surface. In some examples, a single gate pressure may be used to control a plurality of flow channels (e.g., each flow channel interconnecting a respective fluidic source and fluidic drain).

In some examples, the closure surface may be urged against an internal surface of the chamber by a gate pressure received through the fluidic gate, for example, when the gate transmission element is in a particular position. In some examples, the closure surface and the internal surface may be conformal, and in some examples, both may be planar. The closure surface may move away from the internal surface as the gate transmission element moves from a particular position to another position.

In some examples, a device may further include a vent opening, wherein gate fluid received by the fluidic gate leaks around the gate transmission element and exits the device through the vent opening. The fluid leakage around the gate may be used to achieve a pressure drop across the gate transmission element. This may be used to control the gate pressure, for example, in relation to the source and/or drain pressure. The gate transmission element may include one or more features configured to allow fluid leakage, such as a channel through the gate portion, a notch in the periphery of the gate portion, or other feature that allows fluid leakage.

In some examples, a device includes a fluidic output, wherein there is a fluid connection between the fluidic source and the fluidic output when the gate transmission element is in a first position, and no appreciable fluid connection between the fluidic drain and the fluidic output. There may be a fluid connection between the fluidic drain and the fluidic output when the gate transmission element is in a second position, and no appreciable fluid connection between the fluidic source and the fluidic output. In some examples, the device may operate effectively as a binary switch, in which the fluidic output may alternate between a higher (e.g., source) pressure and a lower (e.g., drain) pressure. In some examples, a device may operate as an analog device, in which the output pressure may vary continuously (or quasi-continuously) between a higher pressure and a lower pressure, based on the position of the gate transmission element. For example, the gate transmission element position may be varied between a first position and a second position, and the variation in gate transmission element position may be used to control an output pressure.

In some examples, a device including a fluidic output may be configured to provide a fluidic output pressure that is intermediate between the source pressure and the drain pressure. In some examples, when the gate transmission element is in one position, there is a fluid connection between the fluidic source and the fluidic output, and no appreciable fluid connection between the fluidic drain and the fluidic output. In this configuration, the fluidic output may be denoted as being in a "high" state, with an output pressure similar to that of the source pressure. In some examples, when the gate transmission element is in another position, there is a fluid connection between the fluidic output and the fluidic drain, and no appreciable fluid connection between the fluidic source and the fluidic output. In this configuration, the fluidic output may be denoted as being in a "low" state, with an output pressure similar to that of the drain pressure.

In some examples, a device, such as a device as described herein, does not include an appreciably resilient, compliant, or flexible component. In some examples, effective seals may be achieved using conformal rigid surfaces, for example, between planar surfaces. A rigid surface may be one that does not show significant deformation under the pressures required for normal device operation. Flow control, restriction, or blocking may be provided by contact (or proximity, e.g., in the case of flow restriction) between two conformal surfaces, such as two planar surfaces. In some examples, the surfaces may be formed in a rigid material, such as glass. In some examples, fluid flow through a fluidic device may be controlled using a physical contact between glass surfaces, or between other rigid surfaces. In this context, a rigid surface may show no significant deformation, for example, under contact from the other rigid surface, or from fluid pressures experienced during operation.

In some examples, a device may include a body formed from a rigid body material, the body having a chamber, a fluidic source including a source connection with the chamber, a fluidic drain including a drain connection with the chamber, an optional fluidic output, and a fluidic gate, having a gate connection with the chamber. The device may further include a gate transmission element located within the chamber, where a position of the gate transmission element is controllable between a first position and a second position using a gate pressure received through the fluidic gate such that when in the first position, the gate transmission element is dimensioned to allow fluid to flow between the fluidic source and the fluidic output, and substantially prevent fluid from flowing between the fluidic output and the fluidic drain, and when in the second position, the gate transmission element is dimensioned to allow fluid to flow between the fluidic output and the fluidic drain, and to at least substantially prevent fluid from flowing between the fluidic source and the fluidic output.

In some examples, a device includes a body formed from a rigid body material, the body including a chamber, a fluidic source, a fluidic drain, a fluidic gate, and an fluidic output. In this context, a channel is a flow passage for fluids, where, for example, a source connection may provide a connection between the fluidic source and the chamber. A gate transmission element may be located within the chamber, where the gate transmission element is controllable between a first position and a second position using a gate pressure received through the fluidic gate, and when the gate transmission element is in the first position, there is a fluid connection between the fluidic source and the fluidic output and no appreciable fluid connection between the fluidic output and the fluidic drain, and when the gate transmission element is in the second position, there is a fluid connection between the fluidic drain and the fluidic output and no appreciable fluid connection between the fluidic output and the fluidic source. The gate transmission element may be a unitary glass element, and the body may be a unitary glass body. The gate transmission element may include a connection member, a gate portion at a first end of the connection member having a gate pressure receiving surface, and a closure portion at a second end of the connection member.

In some examples, a method (e.g., of fabricating a fluidic device) includes etching a monolithic rigid body material to form a fluidic valve, wherein the fluidic valve includes a body having a chamber, a fluidic source, a fluidic drain, a fluidic gate, and a gate transmission element located within the chamber. The position of the gate transmission element within the chamber may be controllable between a first position and a second position, for example, using a gate pressure received through the fluidic gate, such that, when in the first position, the gate transmission element is dimensioned to allow fluid to flow between the fluidic source and the fluidic drain, and when in the second position, the gate transmission element is dimensioned to at least substantially prevent fluid from flowing between the fluidic source and the fluidic drain.

In some examples, the gate transmission element may be formed in situ within the chamber, for example, by etching a monolithic rigid body material. Etching the monolithic rigid body material may include exposing selected portions of the monolithic rigid body material to laser radiation, and selectively etching the selected portions of the monolithic rigid body using a chemical etchant. The monolithic rigid body may be a monolithic glass body, and the gate transmission element may be a monolithic glass element.

In some examples, a device may be fabricated using an etching process. In some examples, laser etching may be used to fabricate a device including the body, the gate transmission element formed within a chamber within the body, and any additional desired channels may also be formed by an etching process. In some examples, laser etching may be used to form the gate transmission element in situ within the chamber.

FIG. 10 shows an example method, for example, a method of fabricating a fluidic device such as a fluidic valve. The method 1000 may include providing a rigid material (1010), selectively etching the rigid material to form a chamber having a gate transmission element located therein (1020), and forming source, gate, and drain connections (e.g., using channels) to the chamber (1030). The fluidic valve may be monolithic, without internal connections, and including a gate transmission element having a dimension larger than any internal diameter of the channels connecting to the chamber. The rigid material may include, for example, a glass (e.g., a silicate glass such as fused silica), a ceramic, a polymer, a metal, or other suitable material.

In some examples, a method (such as a method of fabricating a fluidic valve) includes providing a rigid body, and selectively etching the monolithic rigid body to form a fluidic valve. The fluidic valve may include a body having a chamber, a fluidic source having a source connection with the chamber, a fluidic drain having a drain connection with the chamber, a fluidic gate having a gate connection with the chamber, and a gate transmission element located within the chamber. The position of the gate transmission element may be controllable between a first position and a second position using, for example, a gate pressure received through the fluidic gate. In some examples, there may be a fluid connection between the fluidic source and the fluidic drain when the gate transmission element is in a first position, and there may be no appreciable fluid connection between the fluidic source and the fluidic drain when the gate transmission element is in a second position. The rigid body may be a monolithic rigid body. In some examples, a rigid body may include a glass body (such as a monolithic fused silica body), a ceramic body, or other rigid body. Example etching processes may include laser etching, wet etching, or some combination of etching processes. The fluidic valve may then be placed in a fluidic circuit, for example, by providing fluidic connections to the fluidic source, drain, and gate. A fluidic circuit may include a fluidic load. A fluidic load may include one or more actuator, haptic device, other device, or some combination of devices.

In some examples, a fluidic device is fabricated using selective laser etching (SLE), for example, of a rigid body material. Example approaches are described, for example, in "Selective, Laser-Induced Etching of Fused Silica at High Scan-Speeds Using KOH," Hermans et al., Journal of Laser Micro/Nanoengineering (JLMN), vol. 9(2), 126-131 (2014), or in "Selective laser-induced etching of 3D precision quartz glass components for microfluidic applications—up-scaling of complexity and speed", Gottmann, et al., Micromachines, 8(4), 110 (2017). In an example approach, a rigid body material such as a glass, crystal, or other material is selectively exposed to high power laser pulses. The laser pulse exposure may be implemented on a line-by-line basis, so that volumes within the material are selectively exposed to the laser pulses. The laser pulse exposure modifies the material so that the material can then be selectively etched using an etchant, such as a chemical etchant, such as a liquid etchant. Etching selectivity of 1400:1 or higher may be obtained. Example etchants include an aqueous solution of hydrofluoric acid (HF), or potassium hydroxide (KOH). The etchant used may be chosen based on the material to be etched. Laser pulse energies may be in the range 100-1000 nJ, the pulse length may be in the range 100-1000 fs, the pulse repetition rate may be in the range 100 kHz-10 MHz, and the time-averaged laser power may be in the range 50 W-200 W. These are exemplary values, and not limiting. Laser parameters, such as the wavelength, power, pulse length, and the repetition rate may be selected or adjusted to obtain a desired level of absorption of the laser material by the rigid body material. The laser pulse may be focused to a small exposed volume (e.g., having a dimension, such as a diameter, of between 10 microns-1 mm) using a lens. The lens, laser, or material may be positionally and/or orientationally adjusted to spatially configure a sequence of laser-exposed volumes into a line, circle, channel, or any arbitrary volume as desired.

Hence, fluidic valves may be formed within a monolithic rigid body material such as a glass (e.g., fused silica, or a silicate glass, such as a borosilicate glass or an aluminosilicate glass), other oxide-based glass, or an inorganic oxide, such as aluminum oxide (e.g., synthetic sapphire, also referred to as alumina). Fluidic valves may be formed in any rigid body material, as long as the laser pulse exposure conveys selective etching to the material at a desired location. In some examples, a rigid body material may be generally transparent. In this context, a transparent material is one that allows laser pulses to reach a desired location within the material, with sufficient power to obtain the desired transformation of the material, for example, allowing selectively etching of locations exposed to the laser pulses. In some examples, there may be greater laser absorption at the focus location, due to various transformative effects within the material induced by the optical power delivery to that location.

A channel, such as a source connection or other fluid connection within the body, may be formed within a body material by translating the location of laser pulse exposures along a predetermined path within a material, followed by selective etching removal of the laser pulse exposed material. A chamber may be formed within a rigid material by exposing a volume within the material to laser pulses, for example, by scanning the location of the laser pulse exposure within the desired chamber volume in a sequence of linear paths. Furthermore, the gate transmission element may be formed in situ within the chamber by not exposing the desired volume of the gate transmission element to the laser pulses. The etching may take place around the gate transmission element, so that the gate transmission element is then free to move within an etched chamber. The gate transmission element may be formed as a monolithic element of unetched material within the etched volume of the chamber. In some examples, the gate transmission element may not be removable from the chamber after fabrication, without opening the chamber, or otherwise damaging the body.

FIG. 11 shows an example method of device fabrication. The method 1100 may include exposing a rigid material to laser radiation (1110), spatially controlling the laser exposure to determine the etched volume (1120), and selectively etching the laser-exposed rigid material to form a fluidic valve (1130). For example, the method may be used to fabricate a fluidic valve including a gate transmission element movable within an etched chamber. The method may also be used to form a fluidic source, fluidic drain, fluidic gate, and optionally a fluidic output, along with respective connections to the chamber. In some examples, one or more additional channels may be etched, for example, a vent channel (e.g., to allow a pressure drop across a gate transmission element to form from fluid leaking around the gate transmission element), one or more channels allowing connection to a pressure sensor or other transducer, or any other desired channel.

Spatially controlling the laser exposure may be used to define the interior volume to be etched. In some examples, a chamber and a gate transmission element may be etched within a monolithic rigid body. Spatial control of the laser exposure may be used to remove a portion of the interior volume of a chamber, while not removing a portion (such as a remaining portion) that becomes the gate transmission element. The gate transmission element may be formed in situ within the chamber. The chamber and the gate transmission element may be sized so that the gate transmission element may be movable between a first position and a second position. In some examples, selective etching of glass may be used to fabricate micro-scale devices, such as fluidic devices having one or more exterior dimension less than 5 mm, for example, one or more exterior dimensions less than 1 mm.

In some examples, a device may be fabricated using an additive manufacturing process, such as a 3D printing process. The gate transmission element may be fabricated in situ within a chamber formed within a device body, as the body (and the chamber therein) are fabricated. The chamber may be formed as the body is fabricated, and, concurrently, the gate transmission element may be formed within the chamber as the chamber is formed. In some examples, after the fabrication process is complete, the gate transmission element may not be removable from the chamber, for example, without damaging the body. Additive manufacturing may include deposition of one or more of the following materials; a metal, a glass, a ceramic, a dielectric material, a polymer, or other material. In some examples, additive manufacturing may include deposition of a precursor material, which may be subsequently further processed. Further processing may include heat treatment, radiation exposure (e.g., to electromagnetic radiation such as UV, visible, and/or IR radiation), chemical modification, solvent or other component removal, or other process. Example precursor materials include an ormosil, a green ceramic, a polymerizable material (such as a monomer or an oligomer), or other precursor material that may be further processed to form, for example, a metal, a glass, a ceramic, a dielectric material, a polymer, or other material. In some examples, a device may be fabricated using a printable silicone. A device may include a monolithic body, a chamber located within the monolithic body, and a gate transmission element located within the chamber. Appropriate fluid connections (such as channels) may be formed to fluidically interconnect the chamber with any desired fluidic connections (such as a fluidic source, fluidic drain, fluidic gate, fluidic output, bias, or other connection). The channels and/or chamber may be formed during the additive manufacturing process, for example, by spatial modification of the deposition, and/or by deposition of a sacrificial material.

In some examples, a method may include receiving a source pressure at a fluidic source of a fluidic valve, wherein the fluidic valve has a rigid body, and the rigid body includes a chamber having a source connection to the fluidic source. There may be a gate transmission element located within the chamber. The fluidic valve may then receive a change in gate pressure at a fluidic gate, which may have a gate connection to the chamber, and, in response to the change in gate pressure, the gate transmission element may be moved within the chamber to change the device characteristics of the fluidic valve. The device characteristics may include one or more of fluidic output pressure (e.g., in relation to the source pressure and the drain pressure), the degree of fluid communication between the fluidic source and fluidic drain, fluid resistance between any combination of connections, or other device characteristic. For example, the change in gate pressure may be used to urge the gate transmission element against an internal surface of the chamber, which may open and/or close fluid communications between connections to the chamber. In some examples, movement of the gate transmission element may modify the pressure and/or flow rate at one or more connections to the chamber. The gate transmission element may be, or include, a rigid element having a closure surface that may be urged against a portion of the internal surface of the chamber. The closure surface and portion of the internal surface may be conformal, and may, for example, both be planar. In some examples, the contact between the planar closure surface and the planar portion of the internal surface of the chamber may close the fluid connection between two or more connections to the chamber. For example, movement of the gate transmission element to a particular position may close the fluid connection between the fluidic source and the fluidic drain, between a fluidic source and the fluidic output, between the fluidic output and the fluidic drain, or other connection.

In some examples, the device may include a fluidic output having an output connection with the chamber. Moving the gate transmission element located within the chamber in response to the change in gate pressure may close a fluid connection between the fluidic source and the fluidic output and (at the same time) open a fluid connection between the fluidic output and the fluidic drain, or vice versa.

FIG. 12 shows an example method of device operation. A method may include obtaining an output pressure from the fluidic output of the fluidic valve (1210), moving the gate transmission element in response to a change in gate pressure (1220), and obtaining a different output pressure at the fluidic output (1230), for example, in response to the movement of the gate transmission element. For example, the output pressure may change from approximately the source pressure to approximately the drain pressure, or vice versa. The method 1200 may be performed by a fluidic valve, such as a fluidic valve having a gate transmission element, a fluidic source, a fluidic output, a fluidic drain, and a fluidic gate. An example method may further include providing a source pressure at the fluidic source of the fluidic valve, providing a drain pressure at the fluidic drain of the fluidic valve. An example method may further include providing the output pressure to a fluidic load, which may include an actuator or a haptic device.

In some examples, a computer-implemented method may be performed by any suitable computer-executable code and/or computing system. Method steps may be performed by an algorithm whose structure includes and/or is represented by multiple sub-steps.

Prototype fluidic valves were fabricated for evaluation using polymer pieces, such as polyacrylates or polycarbonates. Other generally rigid polymers may be used, such a polyamide, a fluoropolymer such as polytetrafluoroethylene, a cross-linked polymer, or other generally rigid polymer. Example devices may be fabricated using a similar approach, or using any appropriate method. Example devices may be fabricated using selective etching processes.

FIG. 13 shows representative experimental data for an "nFET" type fluidic valve, for example, a device similar to that illustrated in FIG. 6. The figure shows flow rate for a source pressure of 150 kPa, as a function of gate pressure, for different values of drain pressure ($P_D$). The top curve represents a $P_D$ of 0 kPa, then the lower curves represent $P_D$ values of 37.5, 75, and 112.5 kPa, respectively (with the lowest curve representing $P_D$=112.5 kPa). The data shows a sharp transition as a function of gate pressure. The threshold gate pressure is higher for the higher values of drain pressure.

FIG. 14 also shows representative experimental data for an "nFET" type fluidic valve, for example, a device similar to that illustrated in FIG. 6. The figure is similar to FIG. 13, but shows flow properties for source pressure closing. As above, the figure shows flow rate for a source pressure of 150 kPa, as a function of gate pressure, for different values of drain pressure ($P_D$). The top curve represents a $P_D$ of 0 kPa, then the lower curves represent $P_D$ values of 37.5, 75, and 112.5 kPa, respectively (with the lowest curve representing $P_D$=112.5 kPa). The data shows a sharp transition as a function of gate pressure. The threshold gate pressure is higher for the higher values of drain pressure.

Data for the "nFET" designs, including data discussed above in relation to FIGS. 13 and 14, showed that the devices sealed completely, with no measurable flow when the gate was closed, and showed a very sharp transition between on and off states (corresponding to the gate transmission element allowing or blocking flow, respectively. Such devices may be cascaded in fluidic circuits. Device gain may be increased by further reducing flow resistance from underside of the top disk (e.g., as illustrated in FIG. 6) to the drain channel.

Similarly, experimental data obtained for "pFET" devices, for example, similar to those shown in FIG. 3, showed that such devices may be cascaded in fluidic circuits.

Experimental data obtained from "cFET" devices, for example, similar to that shown in FIG. 9, showed no measurable leakage flow. Hence such devices are well suited for use in a fluidic circuit, and may further be cascaded in a fluidic circuit such as a fluidic amplifier.

In some examples, fluidic devices, such as a fluidic valve, may take an input signal including one or more (or a combination of) pressure, flow rate, or mechanical displacement, and generate an output signal of pressure, flow rate, and/or mechanical displacement that is substantially proportional to the input signal. In some examples, this may be achieved using partial actuation of one or more relative area valves, and optionally may be combined with an implementation of pressure-based feedback.

Applications include haptics devices, for example, devices configured to provide tactile feedback, for example, in an augmented reality (AR) or virtual reality (VR) system. In some examples, methods of providing haptic feedback to a user include using a fluidic device (such as described herein) to provide a time-varying pressure signal to the skin of the user. Haptic feedback may include an oscillatory or other time-dependent pressure signal, which may in some examples be conveyed to a user by inflation of an enclosure (such as a bladder) or channel (such as an elastic-walled channel) located close to the skin. Example applications may include hydraulic systems, devices, and methods, such as suspensions (e.g., for vehicles, robots, or any mobile object), transmissions (e.g., for engines, actuators, and the like), and hydraulic actuators (including pushers, drills and other rotating items, and the like). Examples include systems, devices, and methods related to general pneumatic control and pneumatic logic applications, including fluidic logic devices. In some examples, devices and systems may be configured as fluidic control devices or systems, for example, for chemical engineering processing or other applications. Example devices may be configured to control fluid flows, for example, of one or more chemical species, reagents, solvents, and the like. Examples include large-scale industrial control, and smaller scale applications including microfluidics. Examples include devices for inflating one or more pneumatic devices, which may include large devices such as balloons. Applications include robotic devices and components, including soft robotics devices and components, and include grasping arms and manipulator arms. Examples also include control of microfluidic devices for chemical, biological, and biomedical applications, such as bioassays, cell sorting, and the like. In some examples, a fluidic device may be used for pneumatic control of a microfluidics device. Examples also include computational fluidics, including fluidic logic gates and fluidic operational amplifiers. Computational fluidic devices may be used in conditions hostile to conventional electronic components, such as in the presence of ionizing radiation and/or high temperatures. Fluidic valve components and fluids used in a fluidic circuit may have an operational temperature range appropriate to the application and/or operational conditions, which may include temperatures well above or well below typical room temperatures. Fluids may include organic compounds, solvents, molten salts, and the like. Antifreeze-like components may be used for low temperature applications. Inorganic compounds, such as molten salts or molten metals, and may be used as the fluid in high temperature applications (e.g., for rocketry, nuclear reactor control, space applications, and the like).

In some examples, a fluidic circuit may include a relative area fluidic valve with the gate transmission element region pressurized. This configuration may add one more terminal to a relative area valve and may allow for pressurization of the region between the gate and the valve seat. Control of this pressure may enable control of the actuation pressure of normally-closed valves and may also enable use of normally-closed valves as normally-open valves.

In some examples, a relative area fluidic valve may include an innate fluidic feedback and/or may include a high impedance to increase the pressure and/or flow amplification.

In some examples, a device may include a complementary relative area valve circuit, which may include feedback. Feedback may be configured as inverting or non-inverting. In some examples, chained complementary valves may be configured in inverting or non-inverting configurations. In some examples with an inverting chain of fluidic valve stages, the stage outputs may alternate between high and low at the output of each stage. In a non-inverting chain of fluidic valves, the output may be the same (high or low) at the output of each stage. In some examples, a complementary relative area valve may be configured as a differential amplifier. Additionally or alternatively, a complementary relative area valve may be configured as a current mirror. In some examples, a complementary relative area valve may be configured as a positive feedback device and may be used as a pseudo-latch.

Example fluidic circuits may include a differential pair with input controls where one output flow (and/or output pressure) increases as the other output flow (and/or output pressure) decreases. In some examples, a device, such as a fluidic amplifier, may include a pair of fluidic valves configured as a fluidic differential amplifier. A fluidic differential amplifier may be configured with or without output flow buffering.

In some examples, a fluidic circuit, such as an analog fluidic amplifier, may include a single-valve fluidic amplifier including only a single fluidic valve. Example fluidic amplifiers may have different amplifier topologies, such as common gain amplifiers or common gate amplifiers.

A fluidic valve may be termed a fluidistor. In some examples, a fluidic valve (or fluidistor) may provide fluidic pressure gain and/or flow gain. However, examples discussed herein are not limited to devices having pressure and/or flow gain.

In some examples, a buffer amplifier may be used, for example, for signal isolation. In some examples, a fluidic circuit may include a current mirror in which a fluidic flow rate is reproduced in one or more additional fluidic channels.

In some examples, a device, such as a fluidic amplifier, may include a plurality of fluidic valves. A fluidic amplifier may include a differential amplifier. A fluidic amplifier may be configured with or without output flow buffering.

In some examples, a fluidic oscillator may include one or more fluidic valves configured as an amplifier with positive feedback. In some examples, a device may include a fluidic ring oscillator with a frequency control. The frequency control may include an adjustable output flow restrictor. An adjustable flow restrictor may include an adjustable aperture (such as an adjustable area aperture or an aperture selectable from a plurality of apertures having different aperture areas).

In some examples, a flow restrictor, or a high-impedance constant current source, may include an orifice plate, and may be placed upstream of a fluidic valve. A flow restriction upstream of a fluidic circuit may provide a high-impedance pressure input to increase the pressure-to-pressure signal gain (e.g., of a fluidic amplifier including the fluidic valve). In some examples, a flow restrictor may be located downstream of a fluidic valve (e.g., between the drain of the fluidic valve and the drain rail pressure). This may increase the linearity of the input pressure/output flow rate relationship and may provide a method of creating linearly proportional fluidic resistance in the compressible region. In some examples, a single flow restrictor may be placed between a location with variable pressure and a low-pressure location. Provided that the absolute pressure of the low-pressure location is lower than approximately half the absolute pressure of the upstream point, the flow restrictor may be driven into a choking regime, where the flow becomes linearly dependent on the upstream pressure. Thus, a single flow restrictor can turn a non-linear compressible fluid flow into a linear flow/pressure relationship and provide an effectively linear flow resistor. In some examples, two or more orifice plates may be used in series to provide a steady inter-device pressure between a first fluidic valve and a second fluidic valve (e.g., a pressure that is independent of a downstream pressure at the second fluidic valve and dependent only on the upstream pressure). One or more orifice plates may be provided in a method of creating a high-stability pressure source.

A fluidic valve may be termed a "fluidistor" based on the term "fluidic transistor," but a fluidic valve may function differently than an electrical transistor counterpart. Many functions described herein may be achieved with different circuit topologies or a different design of the fluidic valves. Fluidic valves include, for example, normally open, normally closed, and complementary relative area fluidic valves. Examples described herein may use compressible fluids or incompressible fluids. In some examples, a fluid may be a liquid. In some examples, a fluid used in a fluidic device may be (or include) an aqueous fluid (such as water, a salt solution, and the like). In some examples, a fluid used in a fluidic device may be (or include) an oil, such as a hydrocarbon. In some examples, a gas (such as air or nitrogen) may be used instead of a liquid fluid used in a fluidic device, and the like. In some examples, a fluid may be a multiple phase and/or non-Newtonian fluid, such as a liquid crystal, thixotropic liquid, emulsion, micellar solution, and the like. In some examples, a fluidic input may include a pressure and/or flow of a gas (such as air, nitrogen, and inert gas, steam, or other gas or vapor). In some examples, a fluidic output may include a pressure and/or flow of a gas (such as air, nitrogen, and inert gas, steam, or other gas or vapor).

Fluidic circuits may be constructed using discrete components, such as individual fluidic valves interconnected using fluid channels, such as tubing. An adapter board may be used for connecting pressure sensors to Field-Programmable Gate Arrays (FPGAs). For electronic sensors or other circuits, a mains frequency filter (e.g., a 60 Hz filter) may be used to remove electrical noise. In prototyping devices, a housing may connect pressure sensors and/or flow sensors and amplifier board with a variety of mechanical attachment ports. Sealed connections to the sensors may be made without over-compressing the sensors and the connections may be adapted to reduce dead volume and/or the ability to direct flow into different directions. A fluidic circuit prototype may include a controllable pressure source, a flow sensor, and a pressure sensor in series, and an attachment for connecting a fluidic valve or other component to be evaluated. An optical imaging device, such as a high-speed camera, may be used to correlate fluidic variables with mechanical displacement of a membrane.

In some examples, a fluidic valve may be constructed by direct etching of glass. Fluid channels and movable components may be formed by etching system components, such as valve components or seals. In some examples, a fluidic valve may be assembled from individual components. In some examples, a fluidic valve may have a multilayer structure.

In some examples, a fluidic valve may be used in an analog fluidic circuit, which may be used in devices such as a variable-stiffness jammer, user force-dependent grounding, and fine control of soft robots, actuators, and the like. Example devices include fluidic amplifiers having improved or controlled frequency responses and feedback controls, devices providing a conversion of displacement to pressure, or pressure to fluid flow conversion, microfluidic devices, fluidic valves, or other approaches.

Examples may include analog fluidic circuits, which may convert small changes in input pressure and/or input flow into proportional (or semi-proportional) changes in output pressure and/or flow. Fluidic amplification may include fluidic gain in pressure and/or flow, allowing increased output pressure and/or current changes as a result of input pressure and/or current changes. In some examples, the output of a fluidic device may be connected to a haptic device. In some examples, an actuator may affect an all-or-nothing change to a fluidic signal, which may be termed a binary or digital actuator. Semi-continuous signals may be generated by multiple binary actuators working in parallel, but this may involve using a corresponding number of independent controls. Continuous pressure may also be generated through an independent pressure controller; however, in some embodiments these may be bulky and not easily miniaturized. The use of analog fluidic amplifiers may reduce or substantially eliminate such problems. For example, an analog fluidic signal (such as a dynamically variable flow and/or pressure) may be provided by a fluidic amplifier, which in some cases may include only a single fluidic valve.

EXAMPLE EMBODIMENTS

Example 1: An example device may include a body formed from a rigid body material, the body including a chamber, a fluidic source including a source connection with the chamber, a fluidic drain including a drain connection with the chamber, and a fluidic gate, having a gate connection with the chamber. The device may further include a gate transmission element located within the chamber, where a position of the gate transmission element is controllable between a first position and a second position using a gate pressure received through the fluidic gate such that, when in the first position, the gate transmission element is dimensioned to allow fluid to flow between the fluidic source and the fluidic drain, and when in the second position, the gate transmission element is dimensioned to at least substantially prevent fluid from flowing between the fluidic source and the fluidic drain.

Example 2: The device of example 1, wherein the gate transmission element is a unitary glass element.

Example 3: The device of examples 1-2, wherein the body is a unitary glass body.

Example 4: The device of examples 1-3, wherein the gate transmission element comprises a gate portion having a gate pressure receiving surface, and a closure portion having a closure surface.

Example 5. The device of examples 1-4, wherein the gate portion and the closure portion are rigidly connected.

Example 6. The device of example 5, wherein the gate portion is rigidly connected to the closure portion through a connection member, and the connection member is attached to the closure portion on an opposite side of the closure portion to the closure surface.

Example 7. The device of examples 1-6, wherein the gate pressure receiving surface has a gate pressure area, and the closure surface has a closure pressure area, and the gate pressure area is at least double the closure pressure area.

Example 8. The device of examples 1-7, wherein the device is configured so that the closure surface is urged against a portion of the internal surface of the chamber by a change in gate pressure received through the fluidic gate.

Example 9. The device of examples 1-8, wherein the closure surface and the portion of the internal surface of the chamber are both planar.

Example 10: The device of example 8, where the closure surface moves away from the internal surface as the gate transmission element moves from the second position to the first position.

Example 11: The device of examples 1-10, where the gate transmission element includes a gate portion having a gate pressure receiving surface, and a plurality of connection members extending from the gate portion, wherein each connection member has a closure portion located at a distal end, each closure portion having a closure surface.

Example 12: The device of examples 1-10, further including a vent opening, where fluid received by the fluidic gate leaks around the gate transmission element and exits the device through the vent opening.

Example 13: The device of examples 1-10, wherein the device does not include a resilient or flexible component.

Example 14: A device, including a body formed from a rigid body material, the body having a chamber, a fluidic source, a fluidic drain, a fluidic output, and a fluidic gate having a gate connection with the chamber, and a gate transmission element located within the chamber, where a position of the gate transmission element is controllable between a first position and a second position using a gate pressure received through the fluidic gate such that when in the first position, the gate transmission element is dimensioned to allow fluid to flow between the fluidic source and the fluidic output, and to at least substantially prevent fluid from flowing between the fluidic output and the fluidic drain, and when in the second position, the gate transmission element is dimensioned to allow fluid to flow between the fluidic output and the fluidic drain, and to at least substantially prevent fluid from flowing between the fluidic source and the fluidic output.

Example 15: The device of example 14, where the gate transmission element is a unitary glass element, and the body is a unitary glass body.

Example 16: The device of example 14, where the gate transmission element is a unitary fused silica element, and the body is a unitary fused silica body.

Example 17: A method including etching a monolithic rigid body material to form a fluidic valve, wherein etching the monolithic rigid body material includes exposing selected portions of the monolithic rigid body material to laser radiation, and selectively etching the selected portions of the monolithic rigid body using a chemical etchant, where the fluidic valve includes a body having a chamber, and a gate transmission element located within the chamber, and a position of the gate transmission element is controllable between a first position and a second position using a gate pressure received through a fluidic gate such that when in the first position, the gate transmission element is dimensioned to allow fluid to flow between a fluidic source and a fluidic drain, and when in the second position, the gate transmission element is dimensioned to at least substantially prevent fluid from flowing between the fluidic source and the fluidic drain.

Example 18: The method of example 17, wherein etching of the monolithic rigid body material includes forming the gate transmission element in situ within the chamber.

Example 19: The method of examples 17-18, wherein the monolithic rigid body is a monolithic glass body.

Example 20: The method of example 17-19, wherein the gate transmission element is a monolithic glass element.

Embodiments of the instant disclosure may include or be implemented in conjunction with various types of artificial reality systems. Artificial reality is a form of reality that has been adjusted in some manner before presentation to a user, which may include, for example, a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs).

Figure 15:
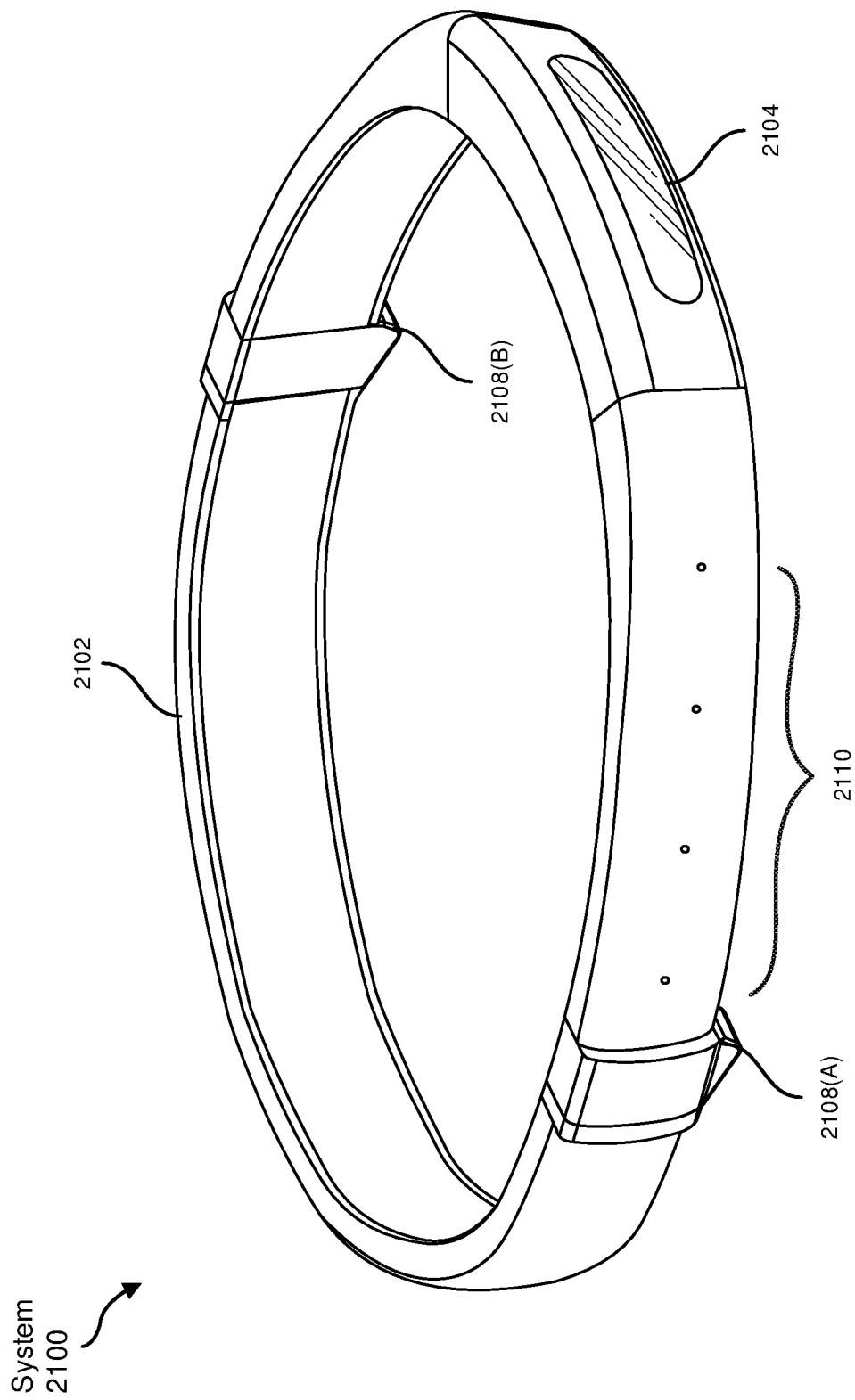
FIG. 15 shows an AR system that includes a wearable device in accordance with some embodiments.

FIG. 15 shows an example AR system 2100. Other artificial reality systems may include an NED that also provides visibility into the real world (e.g., AR system 2200 in FIG. 16) or that visually immerses a user in an artificial reality (e.g., VR system 2300 in FIG. 17). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 15, AR system 2100 generally represents a wearable device dimensioned to fit about a body part (e.g., a head) of a user. As shown in FIG. 15, system 2100 may include a frame 2102 and a camera assembly 104 that is coupled to frame 2102 and configured to gather information about a local environment by observing the local environment. AR system 2100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 2100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 2100 may not include an NED, AR system 2100 may include other types of screens or visual feedback devices (e.g., a display screen integrated into a side of frame 2102).

Figure 16:
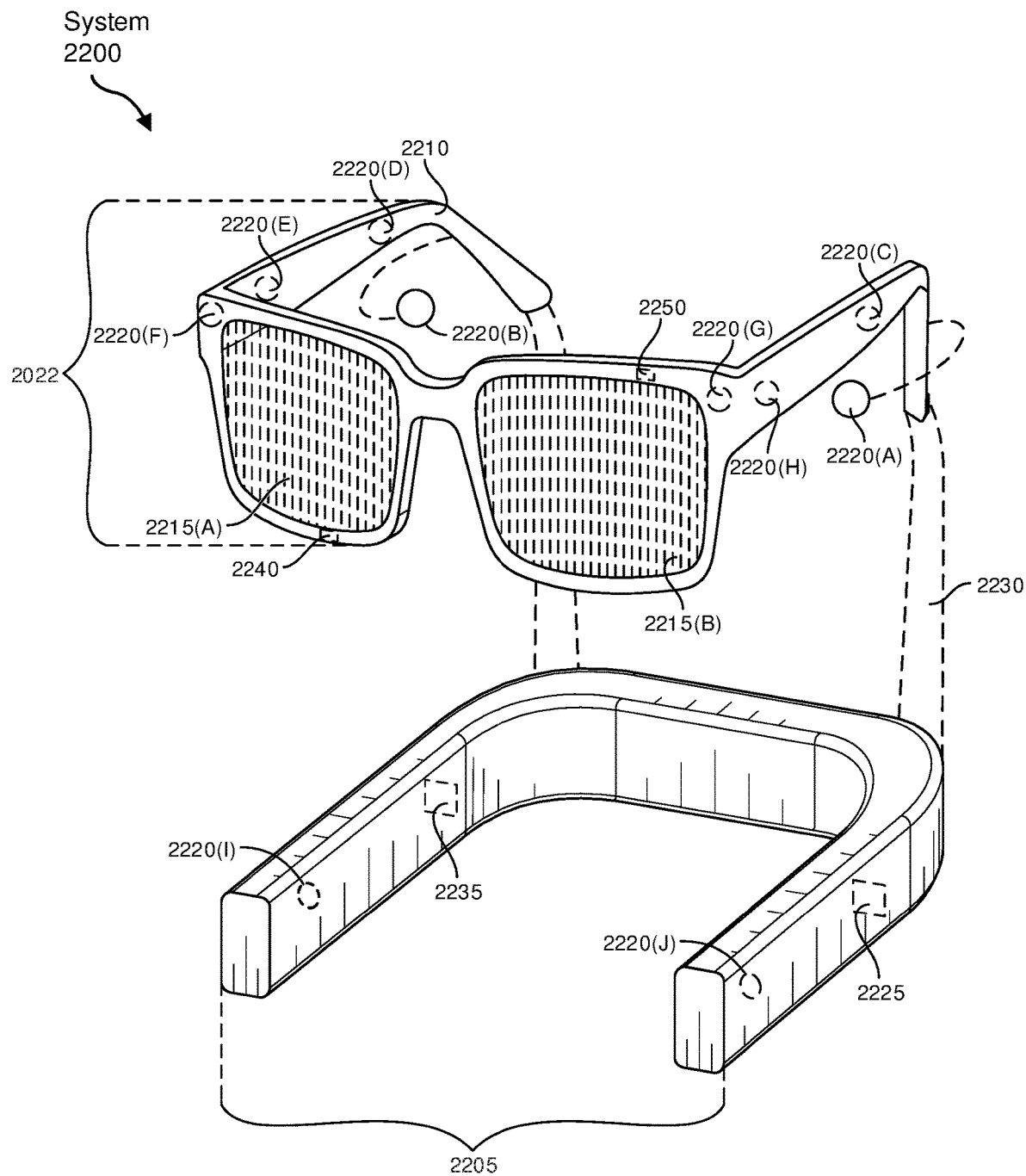
FIG. 16 shows an AR system that includes an eyewear device in accordance with some embodiments.

The embodiments discussed in this disclosure may also be implemented in AR systems that include one or more NEDs, such as a system as shown in FIG. 16.

FIG. 16 shows an AR system 2200 that includes an eyewear device 2202 with a frame 2210 configured to hold a left display device 2215(A) and a right display device 215(B) in front of a user's eyes. Display devices 2215(A) and 2215(B) may act together or independently to present an image or series of images to a user. While AR system 2200 includes two displays, embodiments of this disclosure may be implemented in AR systems with a single NED or more than two NEDs.

In some embodiments, AR system 2200 may include one or more sensors, such as sensor 240. Sensor 240 may generate measurement signals in response to motion of AR system 200 and may be located on substantially any portion of frame 2210. Sensor 2240 may include a position sensor, an inertial measurement unit (IMU), a depth camera assembly, or any combination thereof. In some embodiments, AR system 2200 may or may not include sensor 240 or may include more than one sensor. In embodiments in which sensor 2240 includes an IMU, the IMU may generate calibration data based on measurement signals from sensor 2240. Examples of sensor 2240 may include, without limitation, accelerometers, gyroscopes, magnetometers, other suitable types of sensors that detect motion, sensors used for error correction of the IMU, or some combination thereof.

AR system 2200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 16 may include, for example, ten acoustic sensors: 2220(A) and 2220(B), which may be designed to be placed inside a corresponding ear of the user, acoustic sensors 2220(C), 2220(D), 2220(E), 2220(F), 2220(G), and 2220(H), which may be positioned at various locations on frame 2210, and/or acoustic sensors 2220(I) and 220(J), which may be positioned on a corresponding neckband 2205.

The configuration of acoustic sensors 2220 of the microphone array may vary. While AR system 2200 is shown in FIG. 16 as having ten acoustic sensors 2220, the number of acoustic sensors 2220 may be greater or less than ten. In some embodiments, using higher numbers of acoustic sensors 2220 may increase the amount of audio information collected and/or the sensitivity and accuracy of the audio information. In contrast, using a lower number of acoustic sensors 2220 may decrease the computing power required by the controller 2250 to process the collected audio information. In addition, the position of each acoustic sensor 2220 of the microphone array may vary. For example, the position of an acoustic sensor 2220 may include a defined position on the user, a defined coordinate on the frame 2210, an orientation associated with each acoustic sensor, or some combination thereof.

Acoustic sensors 2220(A) and 2220(B) may be positioned on different parts of the user's ear, such as behind the pinna or within the auricle or fossa. Or, there may be additional acoustic sensors on or surrounding the ear in addition to acoustic sensors 2220 inside the ear canal. Having an acoustic sensor positioned next to an ear canal of a user may enable the microphone array to collect information on how sounds arrive at the ear canal. By positioning at least two of acoustic sensors 2220 on either side of a user's head (e.g., as binaural microphones), AR device 200 may simulate binaural hearing and capture a 3D stereo sound field around about a user's head. In some embodiments, acoustic sensors 2220(A) and 2220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 2220 on frame 2210 may be positioned along the length of the temples, across the bridge, above or below display devices 2215(A) and 2215(B), or some combination thereof. Acoustic sensors 2220 may be oriented such that the microphone array is able to detect sounds in a wide range of directions surrounding the user wearing the AR system 200. In some embodiments, an optimization process may be performed during manufacturing of AR system 2200 to determine relative positioning of each acoustic sensor 220 in the microphone array.

AR system 2200 may further include or be connected to an external device (e.g., a paired device), such as neckband 2205. As shown, neckband 2205 may be coupled to eyewear device 202 via one or more connectors 2230. Connectors 230 may be wired or wireless connectors and may include electrical and/or non-electrical (e.g., structural) components. In some cases, eyewear device 2202 and neckband 2205 may operate independently without any wired or wireless connection between them. While FIG. 16 illustrates the components of eyewear device 2202 and neckband 2205 in example locations on eyewear device 2202 and neckband 2205, the components may be located elsewhere and/or distributed differently on eyewear device 2202 and/or neckband 2205. In some embodiments, the components of eyewear device 2202 and neckband 2205 may be located on one or more additional peripheral devices paired with eyewear device 2202, neckband 2205, or some combination thereof. Furthermore, neckband 2205 generally represents any type or form of paired device. Thus, the following discussion of neckband 2205 may also apply to various other paired devices, such as smart watches, smart phones, wrist bands, other wearable devices, hand-held controllers, tablet computers, laptop computers, etc.

Pairing external devices, such as neckband 2205, with AR eyewear devices may enable the eyewear devices to achieve the form factor of a pair of glasses while still providing sufficient battery and computation power for expanded capabilities. Some or all of the battery power, computational resources, and/or additional features of AR system 2200 may be provided by a paired device or shared between a paired device and an eyewear device, thus reducing the weight, heat profile, and form factor of the eyewear device overall while still retaining desired functionality. For example, neckband 2205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 2205 may be less invasive to a user than weight carried in eyewear device 2202, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 2205 may be communicatively coupled with eyewear device 2202 and/or to other devices. The other devices may provide certain functions (e.g., tracking, localizing, depth mapping, processing, storage, etc.) to AR system 2200. In the embodiment of FIG. 16, neckband 205 may include two acoustic sensors (e.g., 2220(I) and 2220(J)) that are part of the microphone array (or potentially form their own microphone subarray). Neckband 2205 may also include a controller 2225 and a power source 2235.

Acoustic sensors 2220(I) and 2220(J) of neckband 2205 may be configured to detect sound and convert the detected sound into an electronic format (analog or digital). In the embodiment of FIG. 16, acoustic sensors 2220(I) and 2220(J) may be positioned on neckband 205, thereby increasing the distance between the neckband acoustic sensors 2220(I) and 2220(J) and other acoustic sensors 220 positioned on eyewear device 202. In some cases, increasing the distance between acoustic sensors 2220 of the microphone array may improve the accuracy of beamforming performed via the microphone array. For example, if a sound is detected by acoustic sensors 2220(C) and 2220(D) and the distance between acoustic sensors 2220(C) and 2220(D) is greater than, for example, the distance between acoustic sensors 2220(D) and 2220(E), the determined source location of the detected sound may be more accurate than if the sound had been detected by acoustic sensors 2220(D) and 2220(E).

Controller 2225 of neckband 2205 may process information generated by the sensors on neckband 205 and/or AR system 2200. For example, controller 2225 may process information from the microphone array that describes sounds detected by the microphone array. For each detected sound, controller 2225 may perform a DoA estimation to estimate a direction from which the detected sound arrived at the microphone array. As the microphone array detects sounds, controller 2225 may populate an audio data set with the information. In embodiments in which AR system 2200 includes an inertial measurement unit, controller 2225 may compute all inertial and spatial calculations from the IMU located on eyewear device 2202. Connector 2230 may convey information between AR system 2200 and neckband 2205 and between AR system 2200 and controller 2225. The information may be in the form of optical data, electrical data, wireless data, or any other transmittable data form. Moving the processing of information generated by AR system 2200 to neckband 2205 may reduce weight and heat in eyewear device 2202, making it more comfortable to the user.

Power source 2235 in neckband 2205 may provide power to eyewear device 2202 and/or to neckband 2205. Power source 2235 may include, without limitation, lithium ion batteries, lithium-polymer batteries, primary lithium batteries, alkaline batteries, or any other form of power storage. In some cases, power source 2235 may be a wired power source. Including power source 2235 on neckband 2205 instead of on eyewear device 2202 may help better distribute the weight and heat generated by power source 2235.

As noted, some artificial reality systems may, instead of blending an artificial reality with actual reality, substantially replace one or more of a user's sensory perceptions of the real world with a virtual experience.

Figure 17:
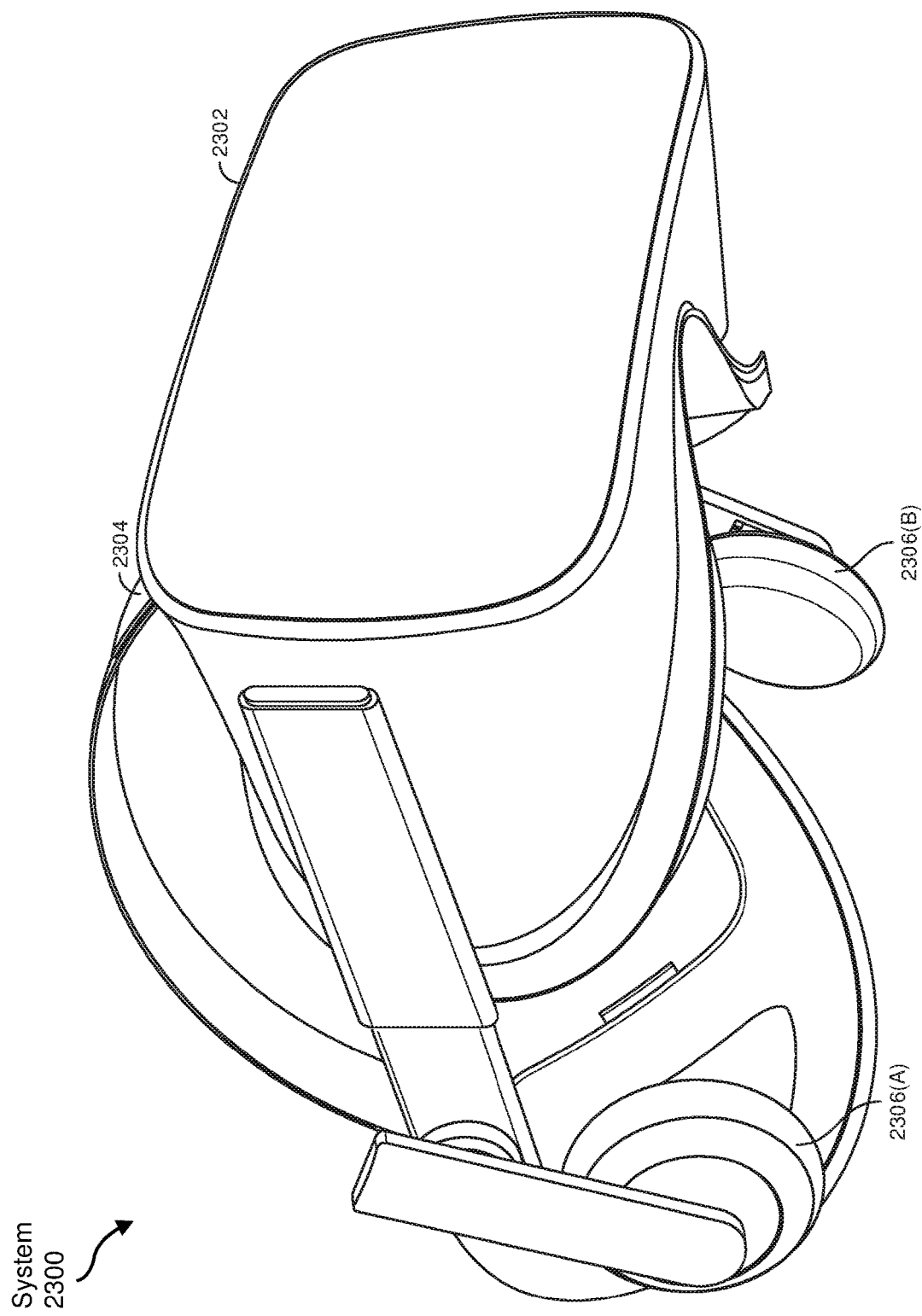
FIG. 17 shows an AR system that includes a head-worn display in accordance with some embodiments.

FIG. 17 shows an example of this type of system is in the form of a head-worn display system, such as VR system 2300, that mostly or completely covers a user's field of view. VR system 300 may include a front rigid body 2302 and a band 2304 shaped to fit around a user's head. VR system 2300 may also include output audio transducers 2306(A) and 2306(B). Furthermore, while not shown in FIG. 17, front rigid body 2302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 2200 and/or VR system 2300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 2200 and/or VR system 2300 may include micro-LED projectors that project light (using, for example, a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 2100, AR system 2200, and/or VR system 2300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 15 and 17, output audio transducers 2108(A), 2108(B), 2306(A), and 2306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 2110 may include condenser microphones, dynamic microphones, ribbon microphones, and/or any other type or form of input transducer. In some embodiments, a single transducer may be used for both audio input and audio output.

While not shown in FIGS. 15-17, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments. Haptic sensations may be provided by fluidic circuits described herein, for example, providing a fluidic output signal having time-dependent pressure and/or flow rate to a haptic device. In some examples, a fluidic circuit may provide a fluidic output signal to a fluidic speaker, configured to convert variations in flow rate and/or pressure to an acoustic signal.

An artificial reality device may include one or more types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes may look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may be configured to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, for example, any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

In some embodiments, an AR system such as described in relation to FIG. 15, 16, or 17, may include a fluidic circuit as described herein, such as a fluidic amplifier. In some examples, a fluidic amplifier may provide a fluidic output to a haptic device, or other actuator.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

As noted, artificial reality systems may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). In some examples, haptic feedback may be provided using a fluidic device. For example, a fluidic circuit (such as a fluidic circuit described herein) may be used to provide a time-dependent fluidic signal (e.g., including a time-dependent fluid pressure and/or flow rate) to a haptic device. The time-dependent fluidic signal may induce a perceptible vibration, pressure, actuation, or other tactile signal to a user. In some examples, an output load of a fluidic circuit may include a haptic device, such as a vibrotactor.

Figure 18:
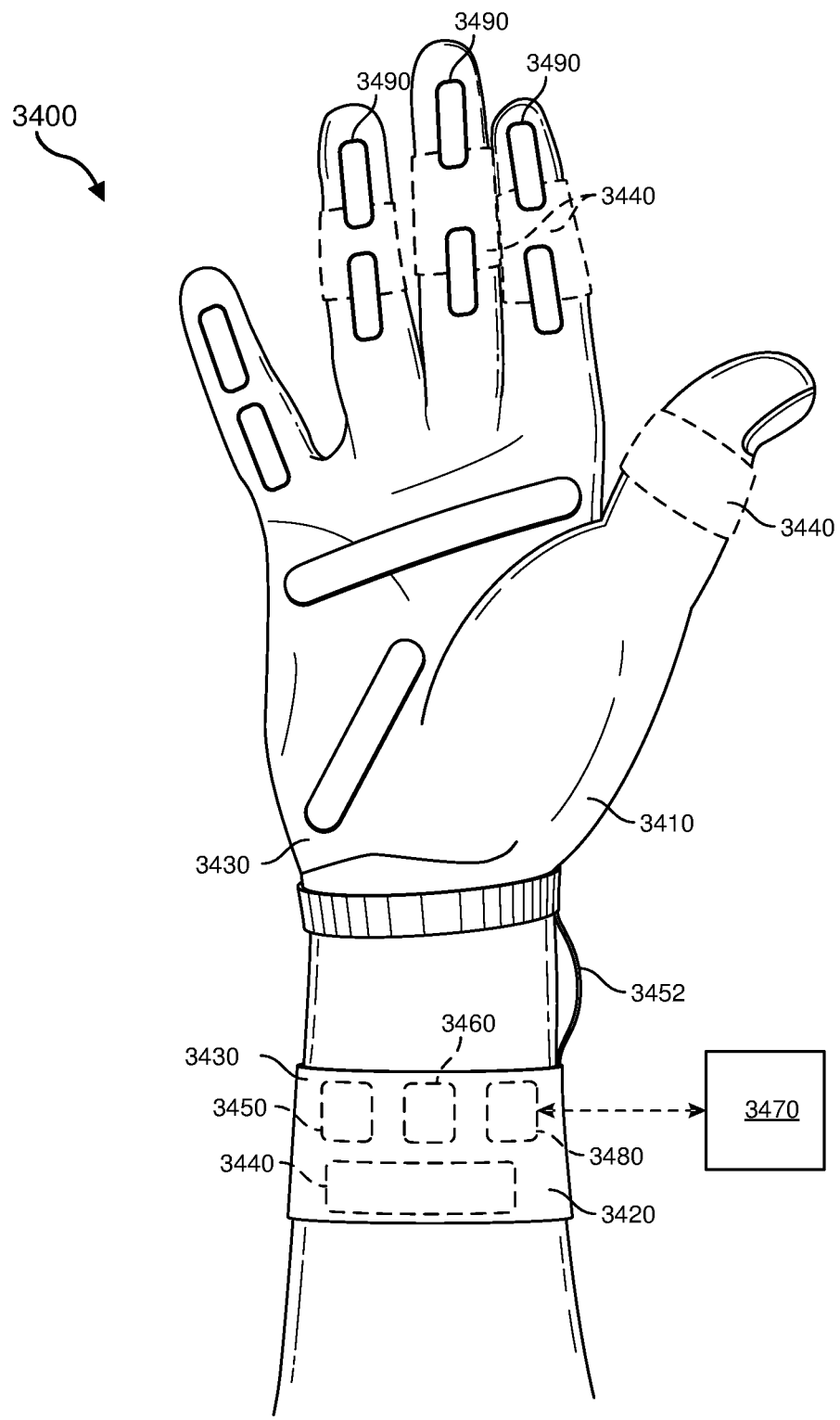
FIG. 18 is an illustration of exemplary haptic devices that may be used in connection with embodiments of this disclosure.

As an example, FIG. 18 illustrates a vibrotactile system 3400 in the form of a wearable glove (haptic device 3410) and wristband (haptic device 3420). Haptic device 3410 and haptic device 3420 are shown as examples of wearable devices that include a flexible, wearable textile material 3430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 3440 may be positioned at least partially within one or more corresponding pockets formed in textile material 3430 of vibrotactile system 3400. Vibrotactile devices 3440 may be positioned in locations to provide a vibrating sensation (e.g., haptic feedback) to a user of vibrotactile system 3400. For example, vibrotactile devices 3440 may be positioned to be against the user's finger(s), thumb, or wrist, as shown in FIG. 18. Vibrotactile devices 3440 may, in some examples, be sufficiently flexible to conform to or bend with the user's corresponding body part(s).

A power source 3450 (e.g., a battery) for applying a voltage to the vibrotactile devices 3440 for activation thereof may be electrically coupled to vibrotactile devices 3440, such as via conductive wiring 3452. In some examples, each of vibrotactile devices 3440 may be independently electrically coupled to power source 3450 for individual activation. In some embodiments, a processor 3460 may be operatively coupled to power source 3450 and configured (e.g., programmed) to control activation of vibrotactile devices 3440.

Vibrotactile system 3400 may be implemented in a variety of ways. In some examples, vibrotactile system 3400 may be a standalone system with integral subsystems and components for operation independent of other devices and systems. As another example, vibrotactile system 3400 may be configured for interaction with another device or system 3470. For example, vibrotactile system 3400 may, in some examples, include a communications interface 3480 for receiving and/or sending signals to the other device or system 3470. The other device or system 3470 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 3480 may enable communications between vibrotactile system 3400 and the other device or system 3470 via a wireless (e.g., Wi-Fi, Bluetooth, cellular, radio, etc.) link or a wired link. If present, communications interface 3480 may be in communication with processor 3460, such as to provide a signal to processor 3460 to activate or deactivate one or more of the vibrotactile devices 3440.

Vibrotactile system 3400 may optionally include other subsystems and components, such as touch-sensitive pads 3490, pressure sensors, motion sensors, position sensors, lighting elements, and/or user interface elements (e.g., an on/off button, a vibration control element, etc.). During use, vibrotactile devices 3440 may be configured to be activated for a variety of different reasons, such as in response to the user's interaction with user interface elements, a signal from the motion or position sensors, a signal from the touch-sensitive pads 3490, a signal from the pressure sensors, a signal from the other device or system 3470, etc.

Although power source 3450, processor 3460, and communications interface 480 are illustrated in FIG. 18 as being positioned in haptic device 3420, the present disclosure is not so limited. For example, one or more of power source 3450, processor 3460, or communications interface 3480 may be positioned within haptic device 3410 or within another wearable textile.

Figure 19:
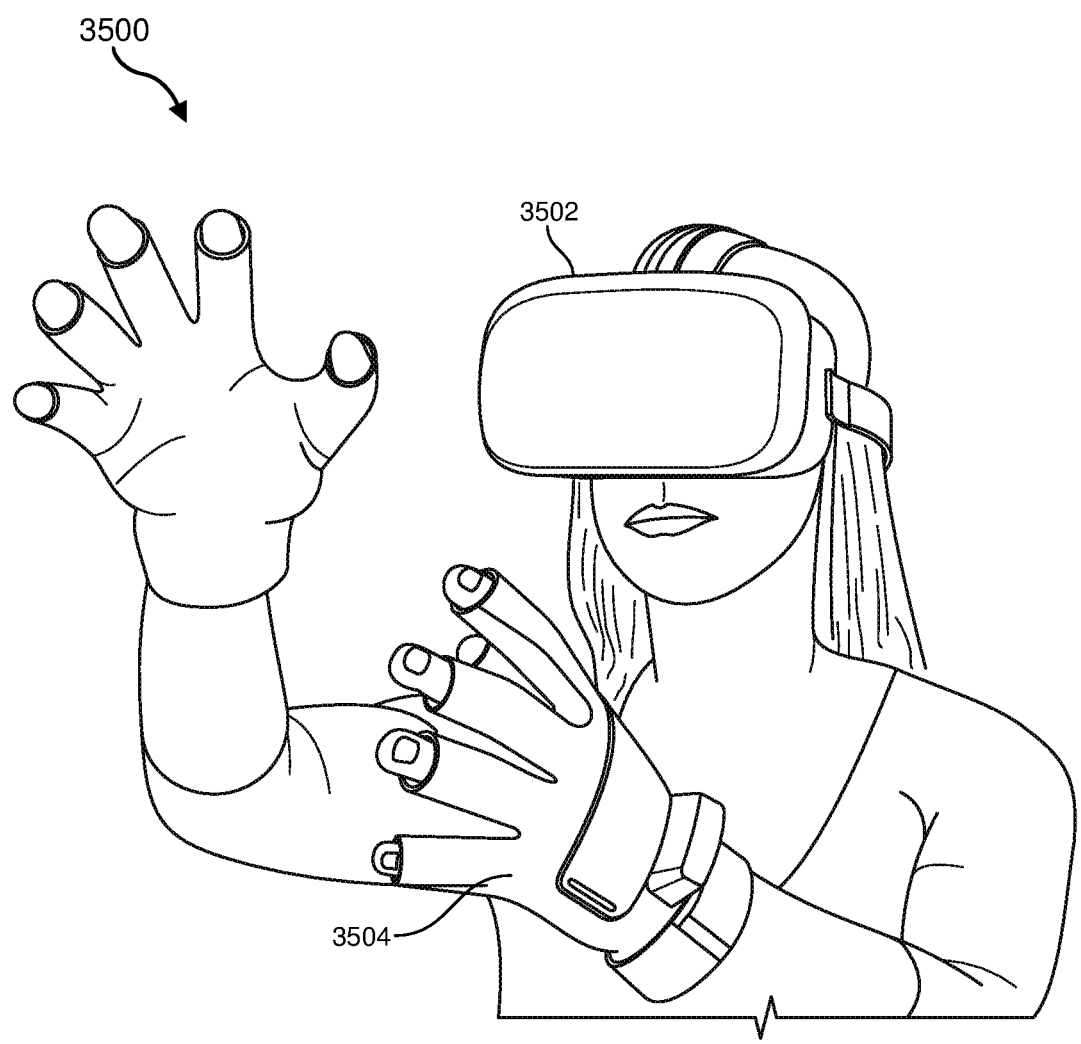
FIG. 19 is an illustration of an exemplary virtual-reality environment according to embodiments of this disclosure.

Haptic wearables, such as those shown in and described in connection with FIG. 18, may be implemented in a variety of types of artificial-reality systems and environments. FIG. 19 shows an example artificial reality environment 500 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system. Head-mounted display 3502 generally represents any type or form of virtual-reality system, such as virtual-reality system 300 in FIG. 3. Haptic device 3504 generally represents any type or form of wearable device, worn by a use of an artificial reality system, that provides haptic feedback to the user to give the user the perception that he or she is physically engaging with a virtual object. In some embodiments, haptic device 3504 may provide haptic feedback by applying vibration, motion, and/or force to the user. For example, haptic device 3504 may limit or augment a user's movement. To give a specific example, haptic device 3504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 3504 to send action requests to a console. Examples of action requests include, without limitation, requests to start an application and/or end the application and/or requests to perform a particular action within the application.

Figure 20:
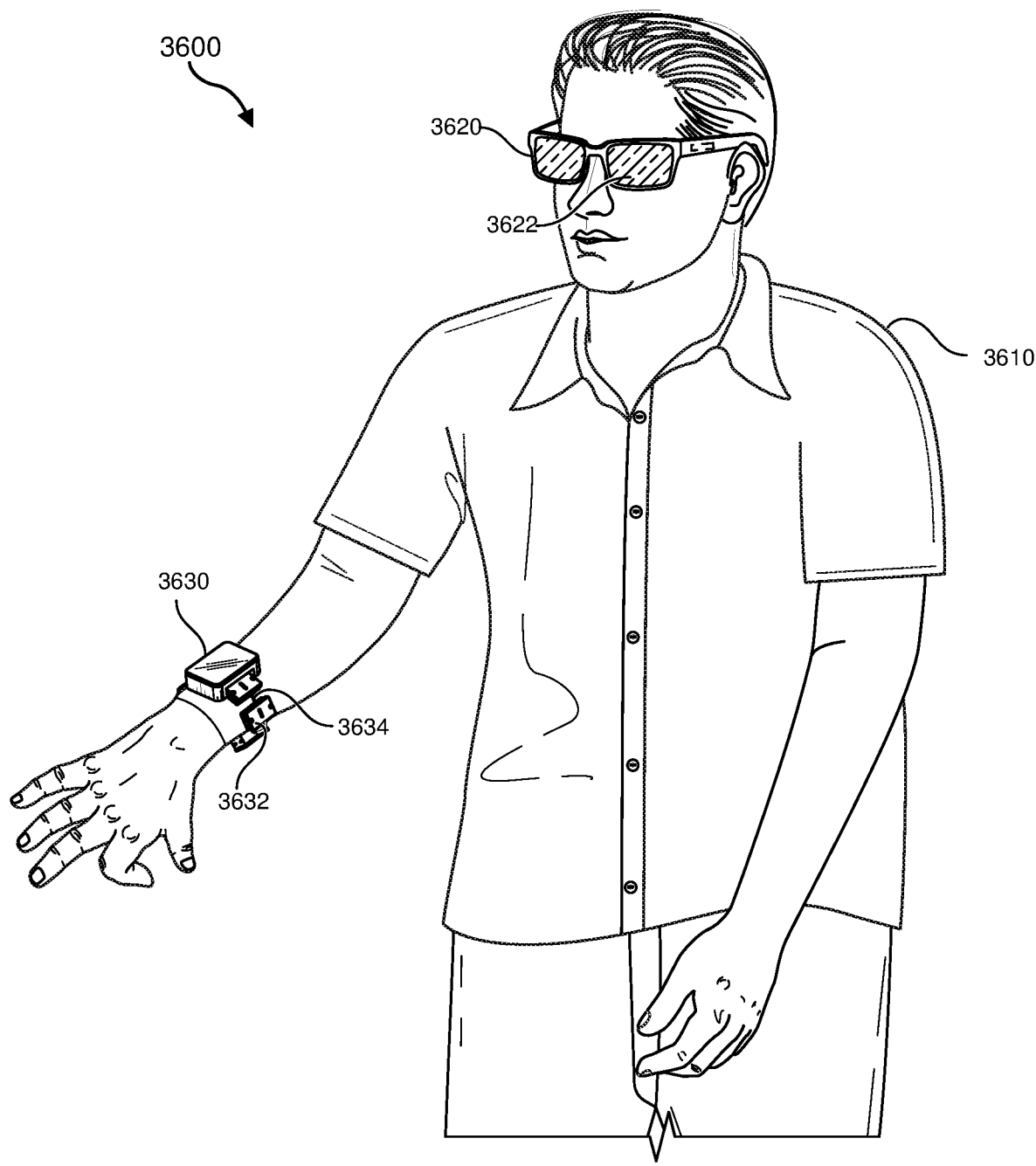
FIG. 20 is an illustration of an exemplary augmented-reality environment according to embodiments of this disclosure.

While haptic interfaces may be used with virtual-reality systems, as shown in FIG. 19, haptic interfaces may also be used with augmented-reality systems, as shown in FIG. 20. FIG. 20 is a perspective view a user 3610 interacting with an augmented-reality system 3600. In this example, user 3610 may wear a pair of augmented-reality glasses 3620 that have one or more displays 3622 and that are paired with a haptic device 3630. Haptic device 3630 may be a wristband that includes a plurality of band elements 3632 and a tensioning mechanism 3634 that connects band elements 3632 to one another.

One or more of band elements 3632 may include any type or form of actuator suitable for providing haptic feedback. For example, one or more of band elements 3632 may be configured to provide one or more of various types of cutaneous feedback, including vibration, force, traction, texture, and/or temperature. To provide such feedback, band elements 3632 may include one or more of various types of actuators. In one example, each of band elements 3632 may include a vibrotactor (e.g., a vibrotactile actuator) configured to vibrate in unison or independently to provide one or more of various types of haptic sensations to a user. Alternatively, only a single band element or a subset of band elements may include vibrotactors.

In some examples, the output load of a fluidic circuit may include one or more vibrotactors. A fluidic circuit may be used to provide a perceptible mechanical feedback to a body part of a user. In some examples, the body part may be a portion of the head, neck, arms, hands, torso, legs, feet, or other body part of a user.

Haptic devices may include any suitable number and/or type of haptic transducer, sensor, and/or feedback mechanism. For example, haptic devices may include one or more mechanical transducers, piezoelectric transducers, and/or fluidic transducers. Haptic devices may also include various combinations of different types and forms of transducers that work together or independently to enhance a user's artificial-reality experience. In one example, each of band elements 3632 of haptic device 3630 may include a vibrotactor (e.g., a vibrotactile actuator) configured to vibrate in unison or independently to provide one or more of various types of haptic sensations to a user.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. In some examples, a function may include providing and/or switching a fluidic input, controlling a sensor and/or a transducer, monitoring and/or controlling a fluid pressure, or responding to a fluidic output. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a signal, such as an electrical signal to be transformed, for example, into a fluidic signal, and more particularly into a haptic signal to a person. In some example, data may be transformed and an output a result of the transformation may be used to perform a function, for example, to control the operation of a device, modulate a fluidic flow, provide a fluidic signal to a fluidic device, or otherwise use the result of the transformation to perform some function, and may also store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure. Features from any of the embodiments described herein may be used in combination with one another in accordance with the general principles described herein. These and other embodiments, features, and advantages will be more fully understood upon reading the following detailed description in conjunction with the accompanying drawings and claims.

What is claimed is:

1. A device, comprising:
   a body formed from a rigid body material, the body having:
   a chamber,
   a fluidic source, comprising a source connection with the chamber,
   a fluidic drain, comprising a drain connection with the chamber,
   a fluidic output, and
   a fluidic gate, comprising a gate connection with the chamber; and
   a gate transmission element located within the chamber,
   wherein a position of the gate transmission element is controllable between a first position and a second position within the chamber using a gate pressure received through the fluidic gate such that:
   when in the first position, the gate transmission element is dimensioned to allow a first fluid flow between the fluidic source and the fluidic output and to impede a second fluid flow between the fluidic output and the fluidic drain;
   when in the second position, the gate transmission element is dimensioned to impede the first fluid flow between the fluidic source and the fluidic output and to allow the second fluid flow between the fluidic output and the fluidic drain;
   the body is a unitary glass body; and
   the gate transmission element is a unitary glass element.

2. The device of claim 1, wherein the gate transmission element comprises:
   a gate portion, having a gate pressure receiving surface; and
   a closure portion, having a closure surface.

3. The device of claim 2, wherein the gate portion and the closure portion are rigidly connected.

4. The device of claim 3, wherein the gate portion is rigidly connected to the closure portion through a connection member, and the connection member is attached to the closure portion on an opposite side of the closure portion to the closure surface.

5. The device of claim 2, wherein:
   the gate pressure receiving surface has a gate pressure area; and
   the closure surface has a closure pressure area, and
   the gate pressure area is at least double the closure pressure area.

6. The device of claim 2, wherein:
   the device is configured so that the closure surface is urged against a portion of an internal surface of the chamber by a change in the gate pressure received through the fluidic gate.

7. The device of claim 6, wherein the closure surface and the portion of the internal surface of the chamber are both planar.

8. The device of claim 6, wherein:
   the closure surface moves away from the internal surface as the gate transmission element moves from the second position to the first position.

9. The device of claim 1, wherein the gate transmission element comprises:
   a gate portion, having a gate pressure receiving surface; and
   a plurality of connection members extending from the gate portion, wherein each connection member has a closure portion located at a distal end, each closure portion having a closure surface.

10. The device of claim 1, further comprising a vent opening,
   wherein fluid received by the fluidic gate leaks around the gate transmission element and exits the device through the vent opening.

11. The device of claim 1, wherein the device does not comprise a resilient or flexible component.

12. The device of claim 1, wherein the body includes fused silica.

13. The device of claim 1, wherein the gate transmission element includes fused silica.

14. A device, comprising:
   a body formed from a rigid body material, wherein the body comprises a chamber, and the chamber is in fluid communication with a fluidic source, a fluidic drain, a fluidic output, and a fluidic gate; and
   a gate transmission element located within the chamber,
   wherein a position of the gate transmission element is controllable between a first position and a second position within the chamber using a gate pressure received through the fluidic gate such that:
   when in the first position, the gate transmission element is dimensioned to allow a first fluid flow between the fluidic source and the fluidic output, and to impede a second fluid flow between the fluidic output and the fluidic drain; and
   when in the second position, the gate transmission element is dimensioned to impede the first fluid flow between the fluidic source and the fluidic output, and to allow the second fluid flow between the fluidic output and the fluidic drain,
   the gate transmission element is a unitary glass element; and
   the body is a unitary glass body.

15. The device of claim 14, wherein:
   the unitary glass element is a unitary fused silica element; and
   the unitary glass body is a unitary fused silica body.

16. A method, comprising:
   etching a monolithic rigid body material to form a fluidic valve, wherein etching the monolithic rigid body material comprises:
      exposing selected portions of the monolithic rigid body material to laser radiation; and
      selectively etching the selected portions of the monolithic rigid body material using a chemical etchant, wherein:
   the fluidic valve comprises a body having a chamber, a fluidic source comprising a source connection with the chamber, a fluidic drain comprising a drain connection with the chamber, a fluidic gate comprising a gate connection with the chamber, a fluidic output, and a gate transmission element located within the chamber;
   wherein a position of the gate transmission element is controllable between a first position and a second position within the chamber using a gate pressure received through the fluidic gate such that:
   when in the first position, the gate transmission element is dimensioned to allow a first fluid flow between the fluidic source and the fluidic output and to impede a second fluid flow between the fluidic output and the fluidic drain;
   when in the second position, the gate transmission element is dimensioned to impede the first fluid flow between the fluidic source and the fluidic output and to allow the second fluid flow between the fluidic output and the fluidic drain;
   the gate transmission element is a unitary glass element; and
   the body is a unitary glass body.

17. The method of claim 16, wherein etching of the monolithic rigid body material comprises forming the gate transmission element in situ within the chamber.

18. The method of claim 16, wherein the body includes fused silica.

19. The method of claim 16, wherein the gate transmission element includes fused silica.

* * * * *